US00RE43301E

(19) United States
(12) Reissued Patent
Claassen

(10) Patent Number: US RE43,301 E
(45) Date of Reissued Patent: Apr. 3, 2012

(54) METHOD AND APPARATUS FOR AN IMPROVED STACK ARRANGEMENT AND OPERATIONS THEREON

(75) Inventor: Stuart L. Claassen, Santa Clara, CA (US)

(73) Assignee: Apple Inc., Cupertino, CA (US)

(21) Appl. No.: 10/270,157

(22) Filed: Oct. 10, 2002

Related U.S. Patent Documents

Reissue of:
(64) Patent No.: 6,148,376
Issued: Nov. 14, 2000
Appl. No.: 08/720,545
Filed: Sep. 30, 1996

U.S. Applications:
(63) Continuation-in-part of application No. 08/644,354, filed on May 10, 1996, now Pat. No. 6,028,962.

(51) Int. Cl.
*G06F 12/00* (2006.01)
(52) U.S. Cl. ..... 711/132; 711/110; 711/136
(58) Field of Classification Search ..... 711/132, 711/110, 136, 202
See application file for complete search history.

(56) References Cited

U.S. PATENT DOCUMENTS

| | | | |
|---|---|---|---|
| 3,810,112 | A | 5/1974 | Aho et al. |
| 4,245,302 | A | 1/1981 | Amdahl |
| 4,546,385 | A | 10/1985 | Anastassiou |
| 4,568,983 | A | 2/1986 | Bobick |
| 4,668,995 | A | 5/1987 | Chen et al. |
| 4,757,440 | A | 7/1988 | Scheuneman |
| 4,882,709 | A | 11/1989 | Wyland |
| 5,023,828 | A | 6/1991 | Grundmann et al. |
| 5,043,870 | A | 8/1991 | Ditzel et al. |
| 5,257,352 | A | 10/1993 | Yamamoto et al. |
| 5,367,650 | A | 11/1994 | Sharangpani et al. |
| 5,408,542 | A | 4/1995 | Callahan |
| 5,450,562 | A | 9/1995 | Rosenberg et al. |
| 5,493,667 | A | 2/1996 | Huck |
| 5,530,883 | A | 6/1996 | Baum et al. |
| 5,592,297 | A | 1/1997 | Van Dorsselaer |
| 5,594,914 | A | 1/1997 | Coomes et al. |
| 5,914,906 | A | 6/1999 | Iadanza et al. |

OTHER PUBLICATIONS

McDaniel, G. "*IBM Dictionary of Computing*", pp. 547 and 643 (1994).

(Continued)

*Primary Examiner* — Hiep Nguyen
(74) *Attorney, Agent, or Firm* — Fenwick & West LLP

(57) ABSTRACT

An apparatus and method for an improved stack comprises an advantageous indexing scheme and stack arrangement allowing more efficient performance of stack operations. The most-recently-used stack item appears at the top of the stack and the least-recently-used item is at the bottom of the stack. Values in between the top and bottom items are ordered from top to bottom with succeedingly less recently used items. An indexing scheme is used to indirectly reference locations of the stack items in the stack. A set of registers is used to reference the locations of the stack items in an embedded memory array. The registers function as pointers to the memory array locations. To promote an item to the top of the stack, the item is identified as the most-recently-used and the contents of the other registers are changed to specify the new locations, e.g. these pointers are shifted down one. Similarly, to insert a new item on to the top of the stack, the pointers are shifted and a new item is written into the memory array location that contains the least-recently-used item.

65 Claims, 12 Drawing Sheets

OTHER PUBLICATIONS

Office Action for U.S. Appl. No. 11/175,957, Jul. 22, 2010, 4 Pages.
Office Action for U.S. Appl. No. 11/175,957, Dec. 29, 2009, 7 Pages.
Office Action for U.S. Appl. No. 11/175,957, Jun. 24, 2009, 4 Pages.
Office Action for U.S. Appl. No. 11/175,957, Oct. 30, 2008, 6 Pages.
Office Action for U.S. Appl. No. 11/175,957, Apr. 17, 2008, 7 Pages.
Office Action for U.S. Appl. No. 11/175,957, Aug. 7, 2007, 8 Pages.

| Current Step rate | Match CV* | 10 | 8 | 6 | Encoding | New Step rate |
|---|---|---|---|---|---|---|
| 6 | 0 | 0 | 0 | 0 | No change | 6 |
| ↓ | 0 | 0 | 0 | 1 | No change | 6 |
| | 0 | 0 | 1 | X | Lower | 8 |
| | 0 | 1 | X | X | Higher | 10 |
| | 1 | X | X | X | No change | 6 |
| 8 | 0 | 0 | 0 | 0 | No change | 8 |
| ↓ | 0 | 0 | 0 | 1 | Lower | 6 |
| | 0 | 0 | 1 | X | No change | 8 |
| | 0 | 1 | X | X | Higher | 10 |
| | 1 | X | X | X | No change | 8 |
| 10 | 0 | 0 | 0 | 0 | No change | 10 |
| ↓ | 0 | 0 | 0 | 1 | Lower | 6 |
| | 0 | 0 | 1 | X | Higher | 8 |
| | 0 | 1 | X | X | No change | 10 |
| | 1 | X | X | X | No change | 10 |

METHOD AND APPARATUS FOR AN IMPROVED STACK ARRANGEMENT AND OPERATIONS THEREON

Matter enclosed in heavy brackets [ ] appears in the original patent but forms no part of this reissue specification; matter printed in italics indicates the additions made by reissue.

This is a continuation-in-part of application Ser. No. 08/644,354, filed May 10, 1996 now U.S. Pat. No. 6,028,962.

FIELD OF THE INVENTION

The present invention relates generally to computer-implemented manipulation of a stack storage model and, more particularly, to an improved computer-implemented stack storage model and operations thereon.

BACKGROUND OF THE INVENTION

Basic stacks and arrays are data structure and data storage concepts that are commonly known in the computer arts. Among other things, stacks are commonly used as an area in storage that stores temporary register information In a gate array Application Specific Integrated Circuit (herein referred to as an "ASIC"), stacks can be implemented as either banks of registers or an embedded memory array to store the stack values. Each of these approaches is problematic.

If a stack is implemented using banks of registers in a gate array ASIC, each register comprised of a given number of flip-flop storage elements typically contains one stack value. The registers are generally connected together in such a way as to allow their data to be shifted down to the register below them or moved to the top register location, as directed by the associated control logic. With this approach, an insertion of a new value or a promotion of an existing value to the top of the stack is generally accomplished in one clock cycle, with all registers taking on their new values following the clock edge. However, as the size of the register values grows and/or as the number of registers increases, the efficiency of the ASIC real estate, e.g. size of the gate array, used decreases.

Although using a typical memory array, rather than registers, avoids the real estate problems posed by register use, the memory array provides access to only one value at a time per data port, wherein a typical memory array has approximately one or two access ports. Depending on the number of values in the array, a considerable number of memory accesses may be required to move each value to the next location in order to insert a new value at the top location.

For example, to insert a fourth item D into an array where location 1 is the top of the stack and the array contains three items, namely, A, B and C, at locations 1, 2 and 3 respectively, the following actions occur. Item A is read and rewritten to location 2 Item B is read and rewritten to location 3. Item C is read and rewritten to location 4. Item D is written to location 1. Thus, implementing a stack as an array produces significant overhead when performing stack operations such as inserting and removing items from the stack.

SUMMARY OF THE INVENTION

Briefly, the present invention is an apparatus and method for an improved stack, said apparatus and method comprising an advantageous indexing scheme and stack arrangement allowing more efficient performance of stack operations.

According to an aspect of the invention, a most recently used stack arrangement is used, wherein the most-recently-used stack item appears at the top of the stack and the least-recently-used item is at the bottom of the stack. Values in between the top and bottom items are ordered from top to bottom with succeedingly less recently used items.

According to another aspect of the invention, a novel combination of array and register storage, is provided. An indexing scheme is used to indirectly reference locations of the stack items in the stack. In an embodiment of the invention, a set of registers is used to reference the locations of the stack items in an embedded memory array. To promote an item to the top of the stack, the contents of the registers are changed to specify the new locations. In other words, the registers function as pointers to the memory array locations and these pointers are shifted to promote an item to the top of the stack. Similarly, to insert a new item on to the top of the stack, the pointers are shifted and a new item is written into the memory array location that contains the least-recently-used item.

According to another aspect of the invention, an MRU register specifies the most-recently-used stack data value and an LRU register specifies the least-recently-used stack data value. When a stack data value is promoted to the top of the stack, the MRU register is set to specify the stack data value and the values of other registers that lie between the MRU register and the register specifying the stack data value that was promoted are shifted down one. When a stack data value is inserted onto the top of the stack, the MRU register is set to the value of the LRU register and the stack data value referenced formerly by the LRU register and newly by the MRU register is set to the new stack data value being inserted. The values of the other registers are shifted down one. Preferably, the changes in register values, including that of the MRU register, occur simultaneously.

The invention provides the following advantages, among others. Stack operations such as insertion, promotion and other rearrangement of the stack items does not require multiple accesses to the memory array. This reduces the overhead incurred during these stack operations and typically increases the speed of such operations. Since the registers typically need only be large enough to uniquely address each memory location, the register size is typically less than that which would be used in stacks which are purely register-based. Thus, the invention can substantially reduce the "real estate" used on a given gate array ASIC.

These and other features of the present inventions, and the advantages offered thereby, are explained in detail hereinafter with reference to specific embodiments illustrated in the accompanying drawings.

DETAILED DESCRIPTION

To facilitate an understanding of the invention, its features are described hereinafter with reference to a particular implementation, namely an image encoding application. It will be appreciated, however, that the practical applications of the invention are not limited to this particular environment. Rather, it will be found to have utility in any situation in which arrays of reasonably repetitious data need to be ordered in a way to provide efficient access of the most-recently-used values.

According to the IBM Dictionary of Computing, McGraw-Hill, Inc., 1994, pages 547 and 643, a stack is, among other things, a pushdown list or pushdown storage such that "data is ordered in such a way that the next item to be retrieved is the most recently stored item. This procedure is usually referred to as 'last-in-first-out' (LIFO)."

The use of the term stack in this application is intended to encompass other methods of organizing and accessing items, as described herein.

Figure 1:
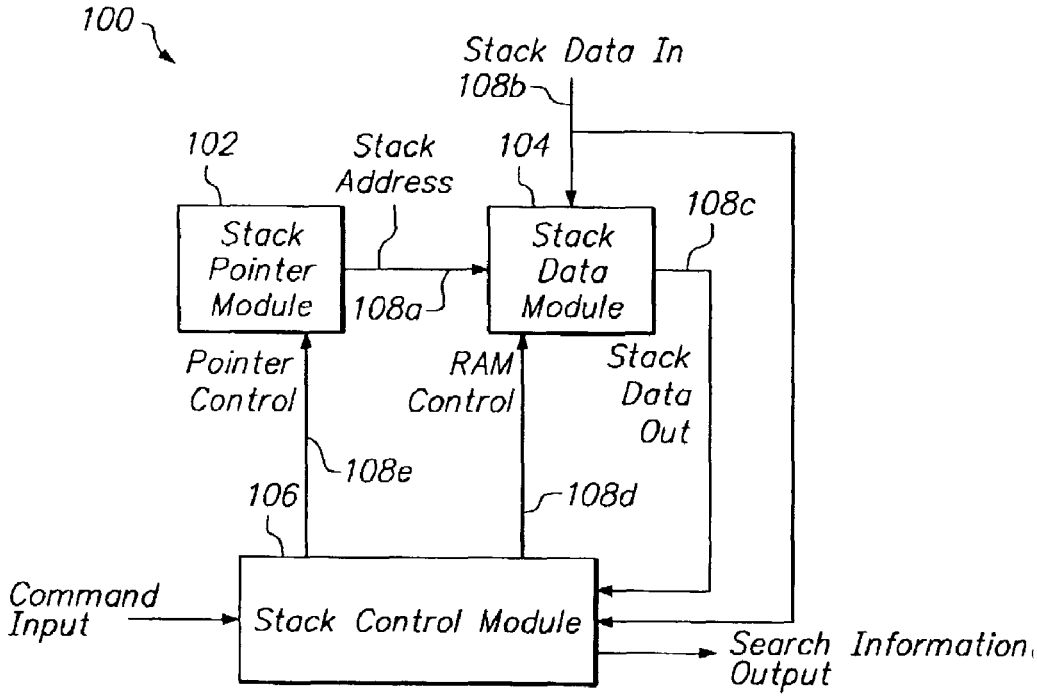
FIG. 1 is a general block diagram of a stack incorporating the invention.

FIG. 1 is block diagram generally depicting a stack 100 incorporating the invention. Stack 100 is preferably implemented as part of ASIC, but may also be implemented in other hardware environments. Stack 100 comprises a stack pointer module 102, a stack data module 104 and a stack control module 106, interconnected by a set of connections 108 as shown. Stack 100 preferably arranged and coupled to an input source (not shown) to receive a command input. Moreover, stack 100 is preferably arranged and coupled to an output destination (not shown) to transfer data to such output destination.

In general, the stack data module 104 contains the stack data, while the stack pointer module is a mechanism for indirectly referencing the stack data in the stack data module. More specifically, the stack data module 104 is a data storage unit, containing one or more stack data values. Stack data module 104 can be, for example, an embedded memory array. The stack pointer module 102 is a data storage unit containing one or more references to locations within the stack data module. For example, stack pointer module 102 can be a set of registers The stack control module 106 generally includes logic for controlling the operations of the stack pointer module and the stack data module in accordance with the invention. The stack control module 106 is also preferably coupled to receive an input such as a command input from a source (not shown) and to transfer an output such as a stack function output to a destination (not shown). Such input may include, but is not limited to, commands like start a search and initialize the stack. Such output may include, but is not limited to, stack function output indicating situations like search finished, 'data found' flag and a position index indicating where the data was found.

The set of connections 108 may be a system bus or other data transfer mechanism. Likewise, the set of connections 108 may be a set of wires arranged and connected to provide the data transfer shown in FIG. 1.

Specifically, an embodiment of the set of connections 108 as shown in FIG. 1 includes a first connection 108a for communicating a stack address from the stack pointer module to the stack data module, a second connection 108b for transferring a stack data value as input to the stack data module and the stack control module, a third connection 108c for transferring stack data from the stack data module to the stack control module, a fourth connection 108d for transferring control instructions regarding the stack memory to the stack data module and a fifth connection 108e for transferring pointer control information to the stack pointer module.

The invention can also be implemented using a memory device, e.g. external SRAM, that is external to an ASIC. For example, an address line can be coupled to the external memory (not shown) and the data can be transferred back into the ASIC.

Preferably stack 100 is organized such that the data values are arranged in order from the most-recently-used item down to the least-recently-used item. This allows the most often used items to be available at the top of the stack, while lesser used items might drop off the bottom of the stack. Herein, the term "MRU stack" is used to denote this type of stack.

Figure 2:
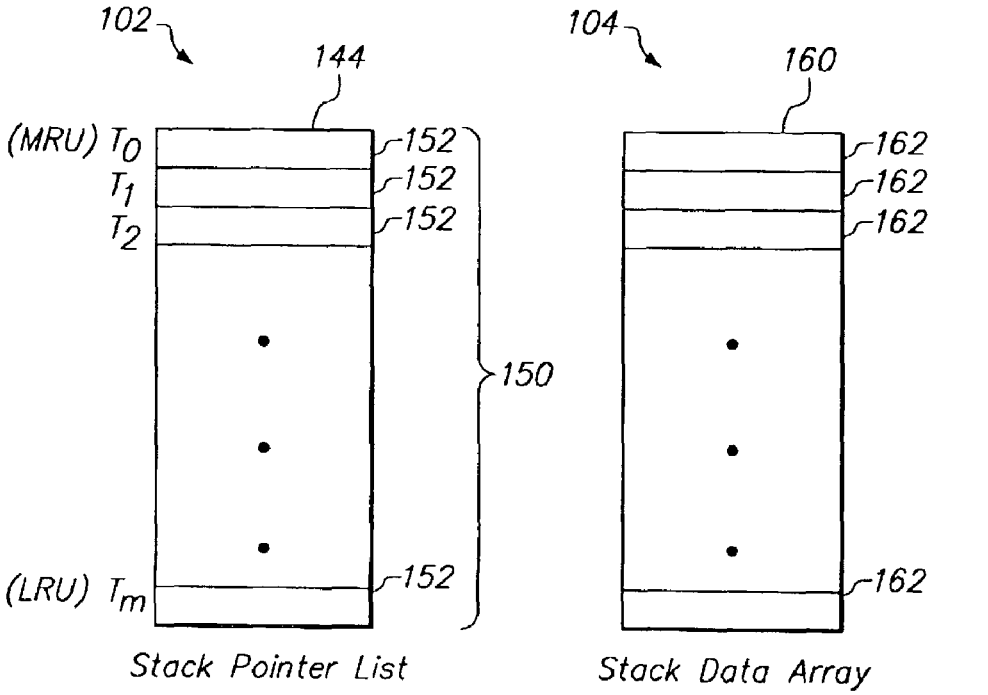
FIG. 2 is a more detailed block diagram of a stack incorporating the invention.

FIG. 2 is a general block diagram more specifically depicting the stack pointer module and the stack data module of FIG. 1 according to an embodiment of the invention. As shown herein, the stack pointer module 102 includes a stack pointer list 144 containing one or more stack pointers, each pointer referencing a location in the stack data storage in the stack data module. The term "stack pointer value" is used to denote the values of the stack pointers themselves. For example, if the first stack pointer in the stack pointer list 144 specifies the address of stack data in the stack data module, then the stack pointer value for the first stack pointer is the specified address.

Preferably, the stack pointer list 144 is implemented as a set of registers 150, including one or more registers 152, each register functioning as a stack pointer. For descriptive ease, the registers 152 are referenced herein by the labels $T_0$ through $T_m$, the number of registers being equal to m+1. The number of registers is dependent and constrained, if at all, by the hardware, the surrounding environment and the overall goals of a particular implementation. Examples of the possible total number of registers include, but are not limited to, 16, 32, or 64.

The stack data module 104 includes stack data stored in a stack data array 160 having one or more array cells 162, each cell 162 specifying either directly or indirectly a stack data value. Stack data array 160 can be, for example, an embedded memory array.

Each register 152 references, either directly or indirectly, an array cell 162 in stack data array 160. Herein, the terms "MRU register", "MRU stack pointer" and "MRU stack pointer location" are used interchangeably to denote the register which references the array cell containing the most recently used stack data value and the term "LRU register", "LRU stack pointer" and "LRU stack pointer location interchangeably to denote the register which references the array cell containing the least recently used stack data value. According to an aspect of the invention, register T0 is the MRU register and register Tm is the LRU register. Preferably, for each array cell 162 in stack data array 160 there is a corresponding register 152 in the set of registers 150.

Preferably, the stack pointer module 102 and the stack data module 104 are initialized prior to use to ensure the consistent initial conditions that may be required by the intended application and also by the ASIC test environment. With reference to FIG. 2, the registers 152 in the set of registers 150 are preferably initialized so that each references a unique array cell 162 in stack data array 160 and such that each array cell 162 in stack data array 160 is referenced by a corresponding register 152 in the set of registers 150. Preferably, each array cell 162 in stack data array 160 is initialized to a zero or null value.

Depending on the particular use of the stack, there may be situations in which a stack is reset/reinitialized to the initial conditions. For example, with reference to the encoding scheme discussed with FIGS. 10-17, the stack is preferably initialized at the start of a data encoding function.

Although in the embodiment of FIG. 2 the stack pointer module is a set of registers and the stack data module is a memory array within an ASIC, the invention is not necessarily limited to this particular implementation. Other data structures and storage configurations, including, but not limited to, those implemented in other technologies, such as standard cell or custom logic, can be used.

Figure 3A:
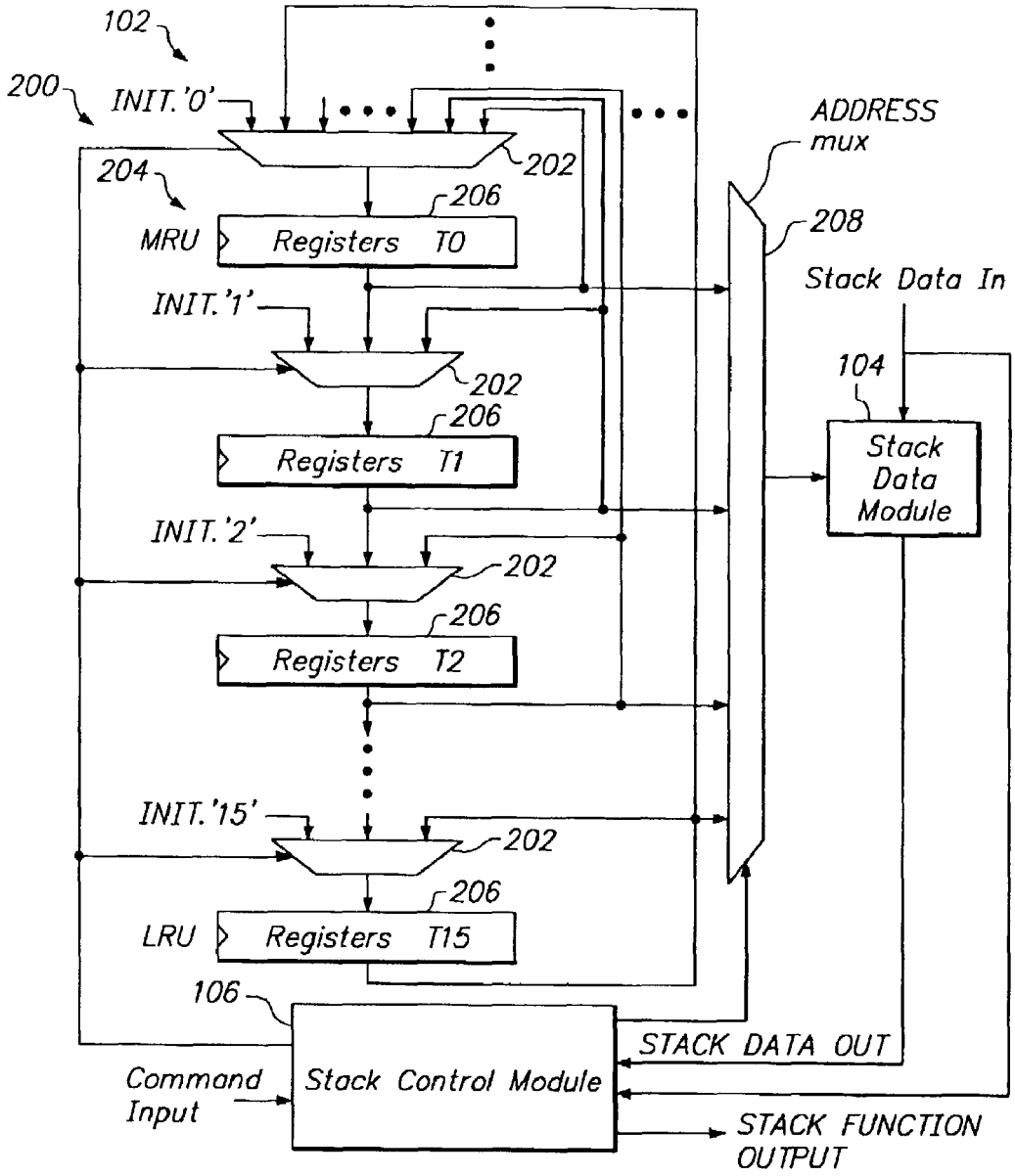
FIG. 3A is a more detailed diagram of a stack pointer module of FIG. 2.

FIG. 3A more specifically illustrates an embodiment of a hardware implementation of the stack pointer module 102 implemented as set of registers as in FIG. 2. The illustration in FIG. 3 is an example of a possible hardware implementation of the stack pointer module 102. Variations and other implementations are certainly possible and fall within the spirit and scope of the invention.

Referring to FIG. 3, stack pointer module 102 includes a set of data multiplexers 200, including one or more data multiplexers 202 (each data multiplexer 202 herein referred to as a "MUX"), a set of registers 204, including one or more registers 206 and an address multiplexer 208. The set of registers 204 is the same as the set of registers 150 in FIG. 2.

Preferably, for each register 206 in the set of registers 204, there is a corresponding MUX 202 in the set of data multiplexers 200. A MUX 202 is arranged and coupled to its corresponding register 206 such that the MUX receives one or more inputs and provides an output to the corresponding register.

As shown in FIG. 3, MUX 202a is coupled to provide output to register $T_0$ and arranged to receive as inputs an initialization value and an input from each register in the set of registers 204, including itself. MUX 202b is coupled to provide output to register $T_1$ and to receive as input an initialization value, data from register $T_0$ and data from register $T_1$. Similarly MUX 202c is coupled to provide output to register $T_2$ and to receive as input an initialization value, data from register $T_1$ and data from register $T_2$. Likewise, the other MUX's (not shown, except for MUX 202 for Register 15) in the set of data multiplexers 200 are connected to their corresponding registers to provide output and are coupled to receive as input an initialization value, data from the preceding register and data from itself.

The address multiplexer 208 routes the address from the selected stack pointer register to the stack data memory, thereby accessing the desired stack data value. Address multiplexer 208 is coupled to provide data to the stack data module and to receive as input data from each of the registers in the set of registers.

Figure 3B:
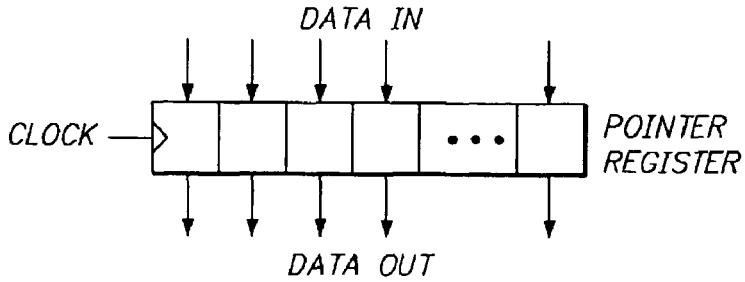
FIG. 3B schematically illustrates transfer of data into and out of the set of registers of FIG. 3A.

FIG. 3B illustrates schematically that the transfer of data into and out of the set of registers, preferably occurs within a single clock cycle. These registers can be implemented with, but are not limited to, standard edge-triggered D-type flip-flops.

Figure 4:
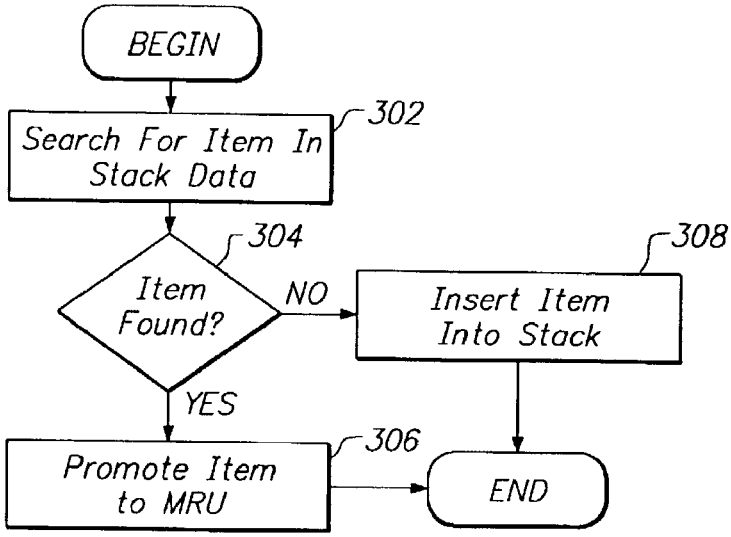
FIG. 4 is a flowchart generally depicting the steps performed during processing of item with respect to the stack of FIG. 2.

FIG. 4 is a flowchart generally depicting the processing of an item according to the invention. This item, e.g. data, is typically received as input from an input source. At step 302, the stack data is searched for the item. If at step 304, it is determined that the item is found in the stack data, then at step 306 the item is promoted to the MRU stack pointer location. However, if at step 304 it is determined that the item was not found in the stack data, then at step 308, the item is inserted into the stack as the most recently used item.

Figure 5:
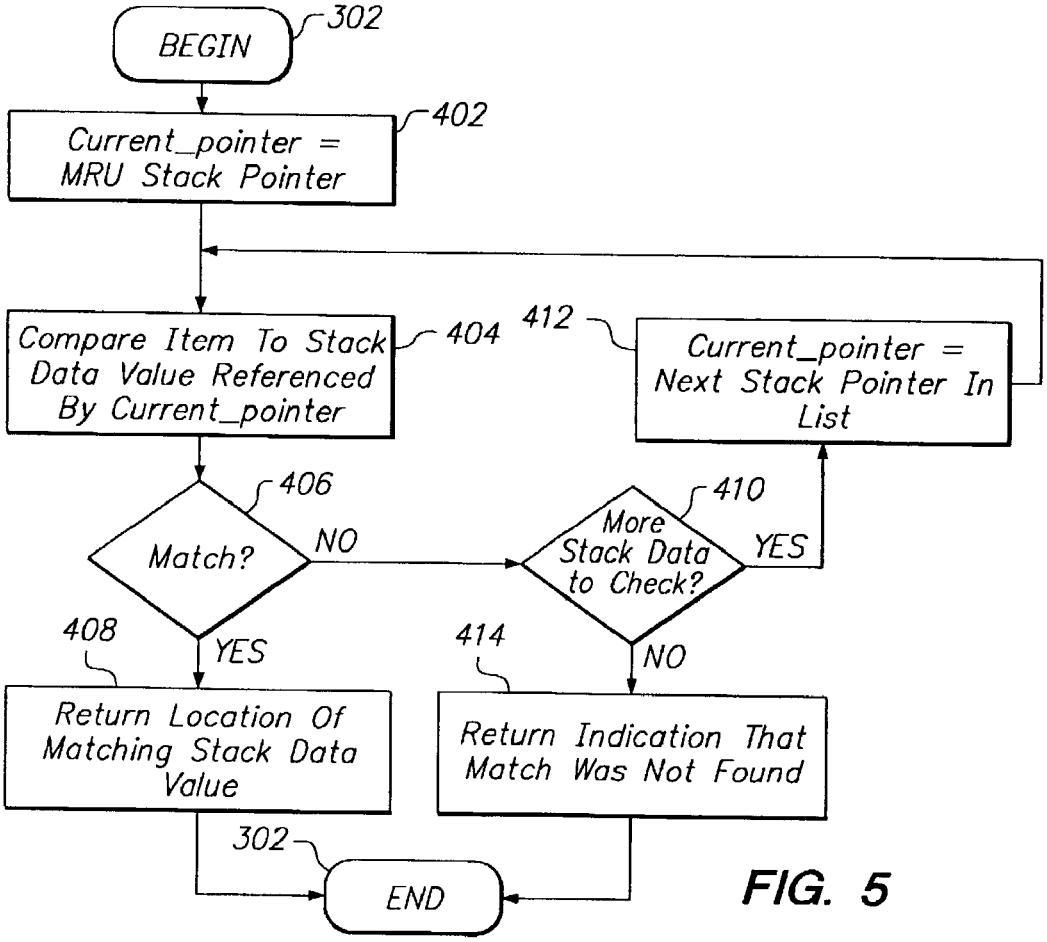
FIG. 5 is a flowchart generally depicting steps performed at block 302 of FIG. 4.

FIG. 5 is a flowchart more specifically illustrating steps performed during a search at step 302 of FIG. 4. For ease of illustration, a temporary variable named "current_pointer" is being used to denote the current stack pointer location being examined. At step 402, the current_pointer is set to specify the MRU slack pointer.

At step 404, the stack data referenced by the stack pointer at the stack pointer location specified by current_pointer is compared to the item. If at step 406 it is determined that there is a match, then at step 408 a reference to the current_pointer is returned. For descriptive purposes, such a reference is denoted as $T_n$.

If at step 406 it is determined that is not a match, then at step 410 it is determined whether there is more data to check. Preferably, this is accomplished by determining whether the current_pointer specifies the LRU stack pointer location. Alternatively, the stack data module can be checked to determine whether there is more stack data to check.

If at step 410 it is determined that there is more data to check, then at step 412, the current_pointer is updated to reference the next slack pointer location in the stack pointer list. For example, if the current_pointer references $T_n$ at step 410, then at step 412 it is updated to reference $T_{n+1}$. After step 412, processing continues at step 404.

If at step 410 it is determined that there is no more data to check, then at step 414, an indication that a match was not found is returned. Such an indication may be achieved by setting the current_pointer to a NIL pointer value or it may be achieved by an indication means separate from the current_pointer If a separate indication means is used, then at step 408, such separate indication means is preferably set to indicate that a match was found.

Figure 6:
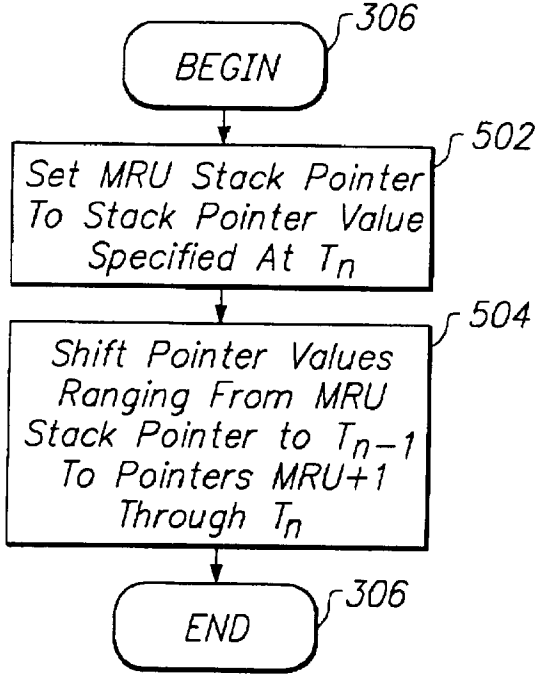
FIG. 6 is a flowchart more specifically depicting steps performed at block 306 of FIG. 4.

FIG. 6 more specifically illustrates steps performed during a promotion operation at step 306 of FIG. 4. At step 502, the stack pointer value at stack pointer location $T_n$ is moved to the MRU stack pointer location. At step 504, while maintaining orderings of the stack pointer values relative to each other, the stack pointer values at the stack pointer locations MRU stack pointer location through $T_{n-1}$ stack pointer location are shifted clown one to occupy the MRU+1 stack pointer location through $T_n$ stack pointer locations. Note that this operation does not access the stack data itself.

Preferably, blocks 502 and 504 occur simultaneously. This is preferably achieved using the combination of edge-triggered D-type flipflops and the corresponding multiplexers as shown in FIG. 3A. By providing the new stack pointer values as inputs to the D-flipflop, the values can typically be changed within a single clock cycle. Whether the transfer of stack pointer values can occur within a single clock cycle generally depends on the number of stack pointers and the constraints of the technology being used.

If steps 502 and 504 are not executed simultaneously, then a temporary variable can be used in the following manner to avoid the loss of a data item. In this situation, the temporary variable is set to the stack pointer value at stack pointer location $T_n$. Then step 504 is executed Then, the MRU stack pointer location is set to the value of the temporary variable.

Figure 7:
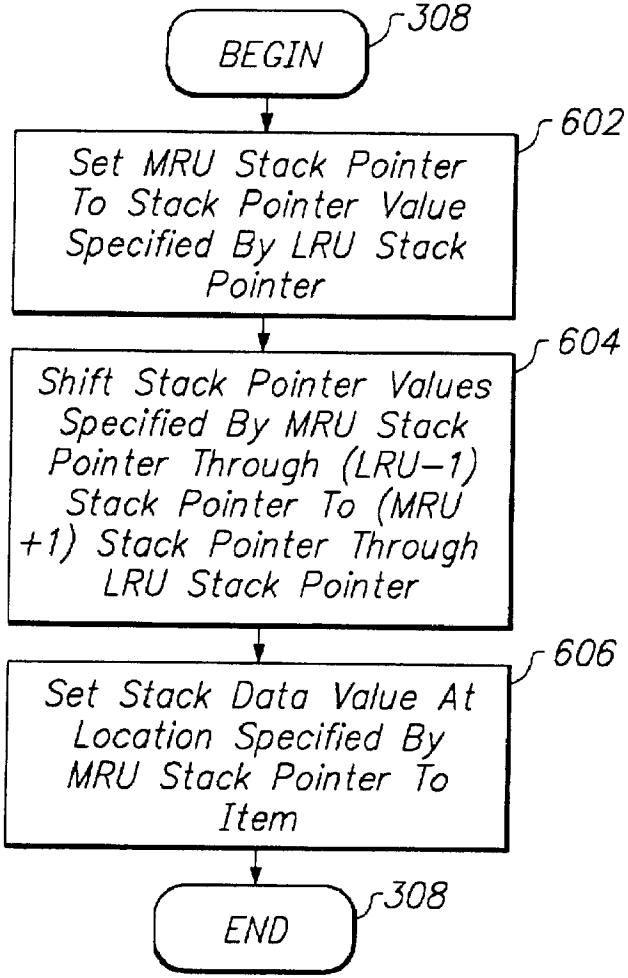
FIG. 7 is a flowchart more specifically depicting steps performed at block 308 of FIG. 4.

FIG. 7 more specifically illustrates steps performed during an insertion operation at step 308 of FIG. 4. At step 602, the MRU stack pointer location is set to the stack pointer value stored at LRU stack pointer location. At step 604, while maintaining orderings of the stack pointer values relative to each other, the stack pointer values at stack pointer locations MRU through LRU−1 are shifted down to stack pointer locations MRU+1 through LRU. Note that this operation does not access the stack data itself. At step 606, the stack data is updated to include the item. Step 606 can be performed at some time before or after step 602. If step 606 is performed before step 602, then the stack data value at the location specified by the LRU stack pointer location is set to the item. If step 606 is performed after step 602, then the stack data value at the location specified by the MRU stack pointer location is set to the item.

Preferably, steps 602 and 604 occur simultaneously. This is preferably achieved using a D-flipflop. By providing the new stack pointer values as inputs to the D-flipflop, the values can typically be changed within a single clock cycle. Whether the transfer of stack pointer values can occur within a single clock cycle generally depends on the number of stack pointers and the constraints of the technology being used.

If steps 602 and 604 are not executed simultaneously, then a temporary variable can be used in the following manner to avoid the loss of a data item. In this situation, the temporary variable is set to the stack pointer value at stack pointer location $T_n$. Then step 604 is executed. Then, the MRU stack pointer location is set to the value of the temporary variable.

Any new item inserted into the stack causes the least-recently-used item (LRU) to conceptually fall off the bottom of the stack and all other items to shift down one position.

Advantageously, the insertion and promotion operations shown in FIGS. 6 and 7 are achieved without directly accessing or manipulating the stack data itself. Rather, the stack pointers are accessed and manipulated to perform the insertion and promotion operations. Thus, performance of insertion and promotion operations is not directly affected by the size of the individual stack data values. Stack data value size can be easily increased, since it is implemented in an area efficient memory array and is decoupled from the pointer operation. Moreover, since the pointer values represent the address of the stack data values, only n bits of pointer are required to address $2^n$ stack data values. This allows the size of the pointers to typically be much smaller than the size of the stack data value. Therefore, manipulating the pointers rather than the stack data itself, typically increases the speed and area efficiency of the insertion and promotion operations. This efficiency generally increases as the size or number of stack data values increases.

Figure 8:
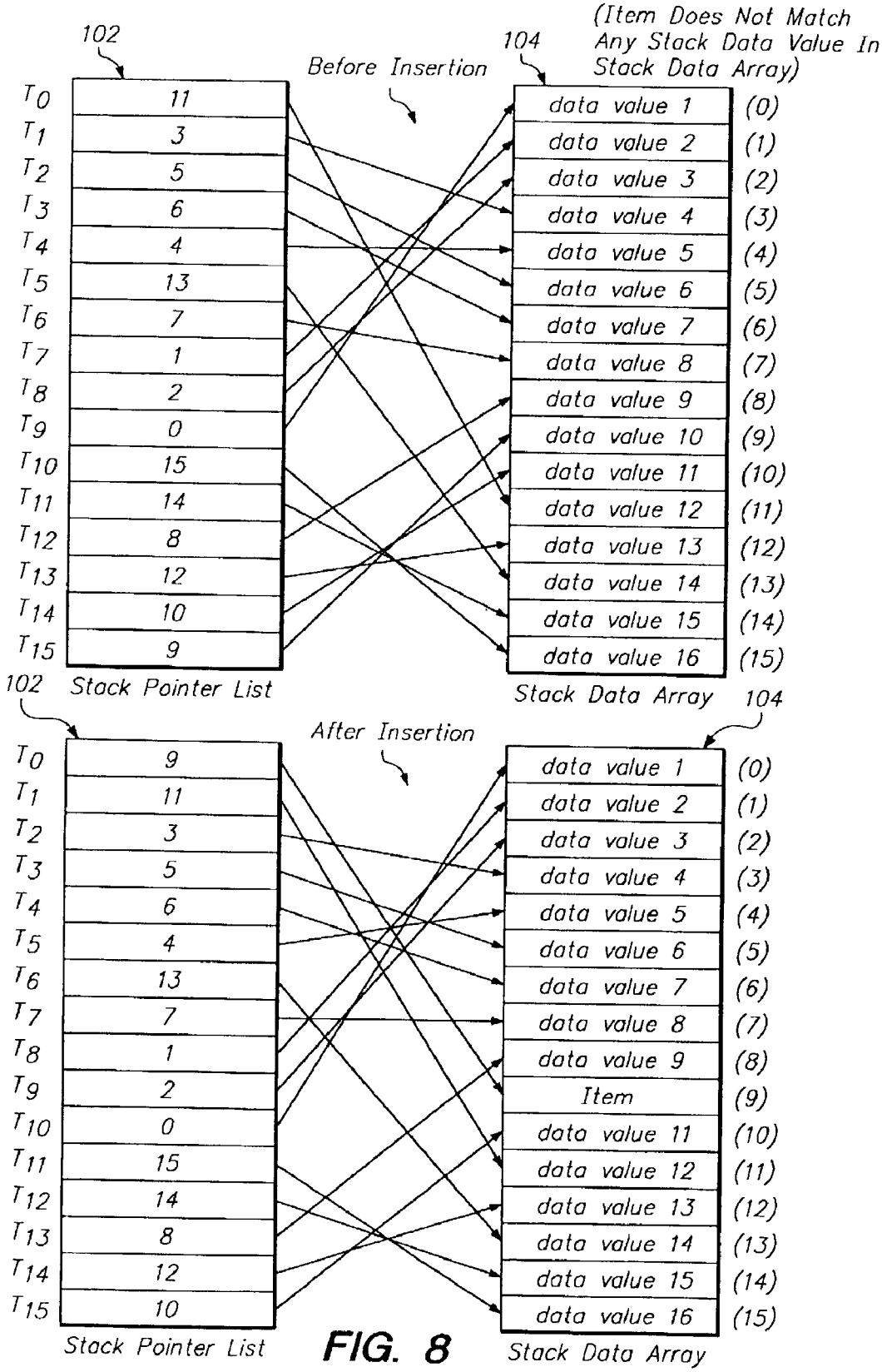
FIG. 8 illustrates contents of an example of a stack during an insertion operation performed on a stack according to the invention.

FIG. 8 illustrates schematically an example of an insertion operation performed on a stack according to the invention. In this example, it is assumed that it has already been determined that the item does not match any data value in the data stack. Therefore, the item is being inserted into the stack. The MRU stack pointer location is set to the LRU stack pointer location and the other stack pointers in the list are shifted down. The item is then inserted into the stack data at the location specified by the new MRU stack pointer location. Note that since the stack data is full, the least recently used data value at the beginning of the insertion operation, here data value 10, is dropped from the stack data as a result of the insertion of the item. In a data encoding application, this allows the data values that are not currently being discovered in the input data stream to "fall off" the stack and be replaced with current data values.

Figure 9:
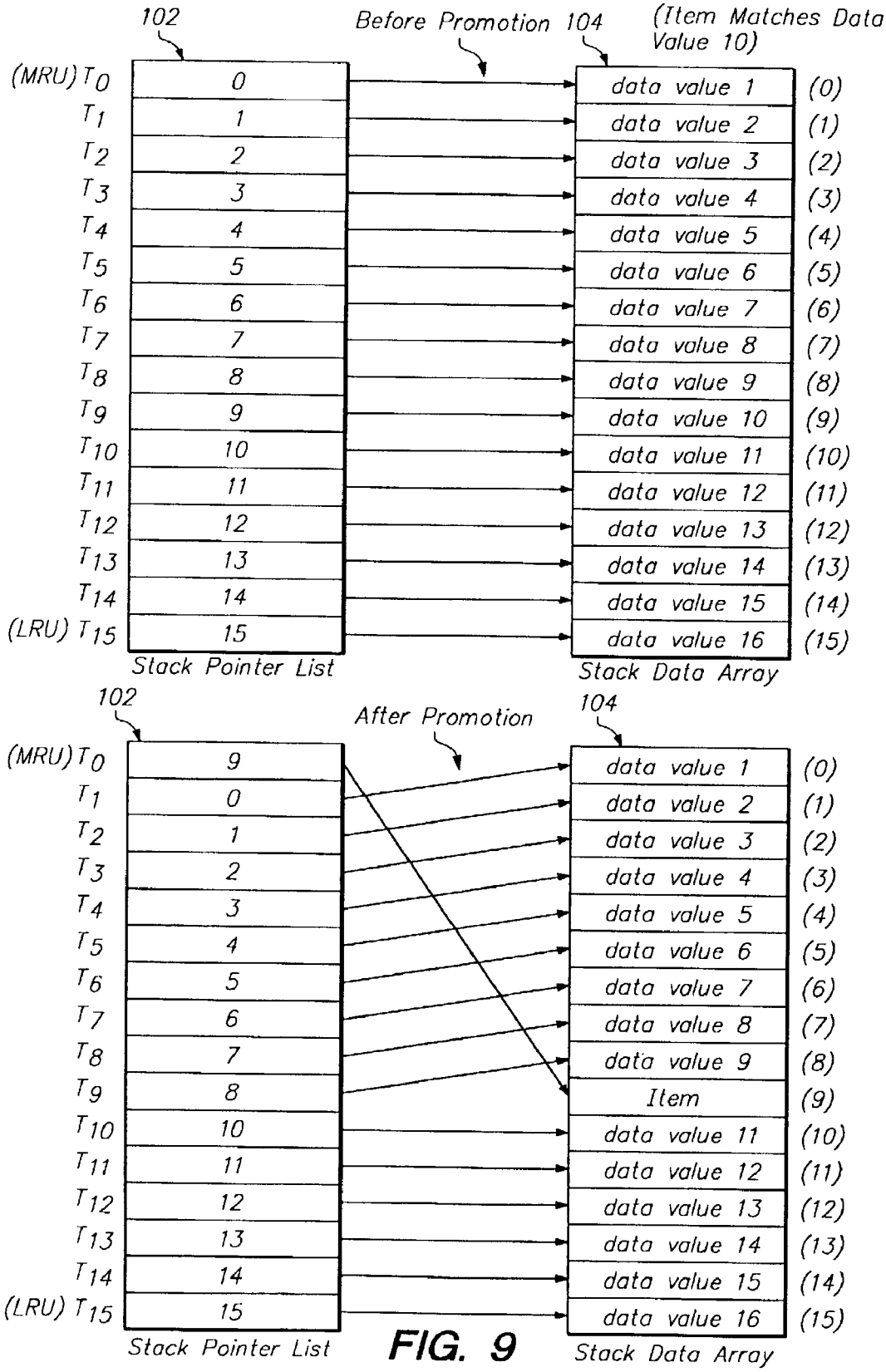
FIG. 9 illustrates contents of an example of a stack during a promotion operation performed on a stack according to the invention.

FIG. 9 illustrates schematically an example of a promotion operation performed on a stack according to the invention. In this example, it is assumed that it has already been determined that the item matches data value 10 at location 9 in the stack data. The MRU stack pointer location is set to the stack pointer at the stack pointer location which references data value 10 at location 9, herein $T_9$. Thus, the MRU stack pointer location is updated to reference stack data location 9. The other stack pointers in the list are then shifted down one. Note that the stack data values were not accessed or directly manipulated in order to promote the item to the top of the stack. Again, in a data encoding application, this allows the most recent data (and therefore most likely to re-occur) to be available at the top of the stack, reducing the stack search time as well as providing the opportunity to further enhance the encoding of the top several pointer values with a form of Huffman encoding.

The invention can be employed in a variety of applications. An example of such a use is an encoding system and method as shown in FIGS. 10-17. FIGS. 10-17 illustrate an encoding system and method that may generally be employed to efficiently code images for transmission or storage. By way of example, the encoding scheme may be used to code images for efficient transmission to or within a printer, facsimile, or simply for database file storage. However, to facilitate discussion, the encoding system will be explained within the context of printer data compression.

Figure 10:
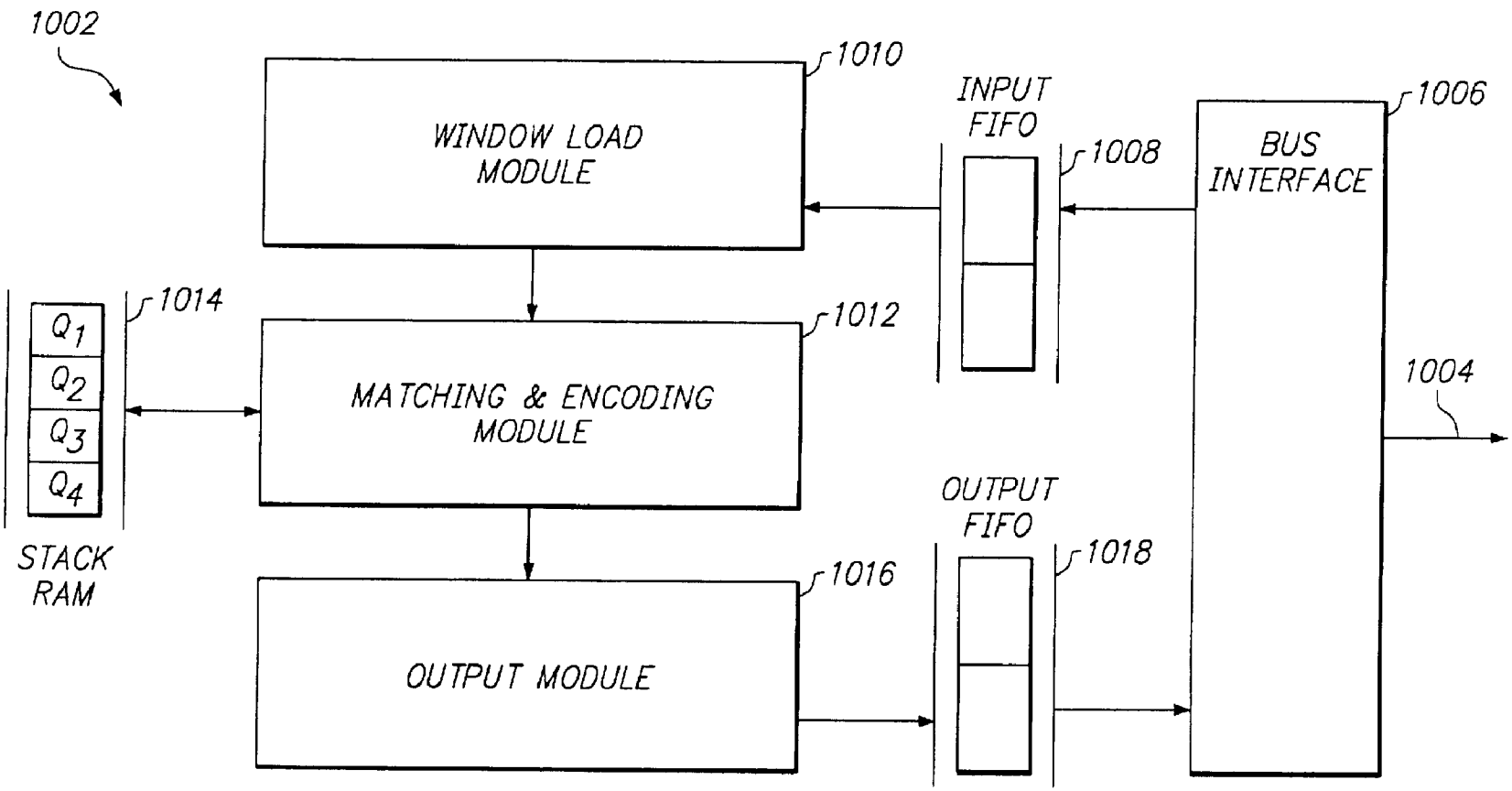
FIG. 10 is a general top level block diagram of an image compression unit employing an embodiment of the present invention.
Figure 11:
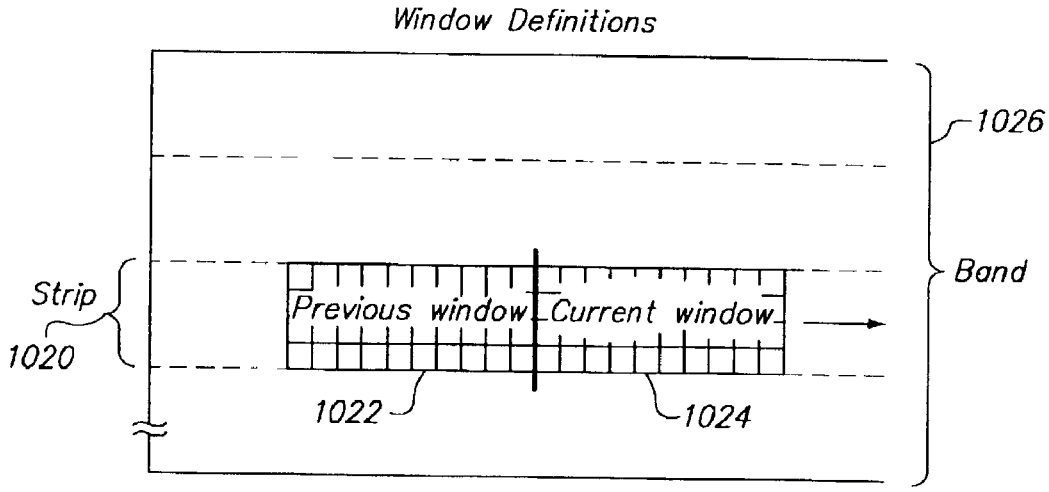
FIG. 11 illustrates various data unit definitions used in the specification.

FIG. 10 illustrates an overall block diagram of a compression unit (1002) incorporating an embodiment of the present invention. The compression unit (1002) may preferably be implemented on a single integrated circuit chip for enhanced performance and marketability. Yet, as those having skill in the art will readily appreciate, the functions described herein may be implemented using any combination of distinct units, or by one software-driven general purpose unit.

The functions performed by the compression unit (1002) may be divided into the four following principal tasks: 1) image loading; 2) step rate selection; 3) matching and encoding; and 4) output and formatting. Broadly speaking, the image loading function is performed by the input FIFO (1008) and window load module (1010), and serves to download windows of image data from system DRAM (not shown) for processing by the matching and encoding module (1012). The step rate selection function examines the size of the windows downloaded by the window load module (1010), and changes the window length to coincide with any detected repetition of image data from one window to the next. The matching and encoding function performs the actual task of encoding the windows. And last, the output function converts the coded windows into a format suitable for output. These functions will become clear from the ensuing detailed discussion.

As shown in FIG. 10, the compression unit (1002) is connected to a system bus (1004) via bus interface (1006). In an exemplary embodiment, the compression unit functions as a slave processor, and compresses data when so commanded by the host system.

When so instructed, the compression unit (1002) downloads a strip of image data from system DRAM (not shown) for storage in the input FIFO (1008). Particularly, the input FIFO (1008) includes two memory sections. The first section of the FIFO (1008) is filled first, upon which a FIFO Valid bit is set. The compression unit (1002) then attempts to fill the second section of the FIFO (1008), depending on the availability of the bus.

Upon detecting a FIFO Valid bit, the window loading module (1010) loads a block of data, referred to as a window, from the input FIFO (1008). A window of image data may be best understood with reference to FIG. 11. As shown therein, a page of image data stored in system DRAM comprises a plurality of bands (1026), which may be broken down into strips (1020) having four raster lines each in width. A window (e.g. 1024) is a portion of the strip (1020), typically having a length of 6, 8 or 10 pixels in an exemplary embodiment. Furthermore, although not shown in FIG. 11, each pixel within the window is coded using three bits. These three bits can be used to identify eight different values for each pixel. Five of these values are allocated to describing five gray levels of image. One value is used to identify a bilevel (solid black) text pixel. Another value identifies a bilevel image pixel. The remaining value describes a white pixel. Accordingly, each window may be viewed as three-dimensional. The window width consists of four raster lines of information, the length consists of either 6, 8 or 10 pixels, and the depth consists of the three bit value used to code the value of the pixel.

Windows are moved across the 4-row strip (1020) of pixels at a step rate of 6, 8 or 10 pixels. The window load module (1010) continues to sequence through the strip (1020) until it has read all of the image data stored in the first section of the input FIFO (1008). The window load module (1010) then resets the FIFO valid bit to instruct the FIFO (1008) to provide more data. If the second half of the FIFO (1008) has been loaded, as described above, the FIFO switches in ping-pong fashion to that data and once again sets the FIFO Valid bit. The window load module (1010) then proceeds to read from the second half of the input FIFO (1008).

Finally, at the end of each strip within a band, the input FIFO (1008) is flushed and reloaded from the start of a new strip.

Figure 12A:
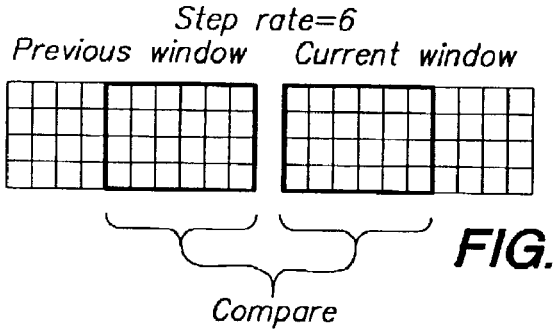
FIGS. 12(a), 12(b) and 12(c) illustrate the basis for comparison between blocks of data using step rates of 6, 8 and 10 pixels per step, respectively.
Figure 12B:
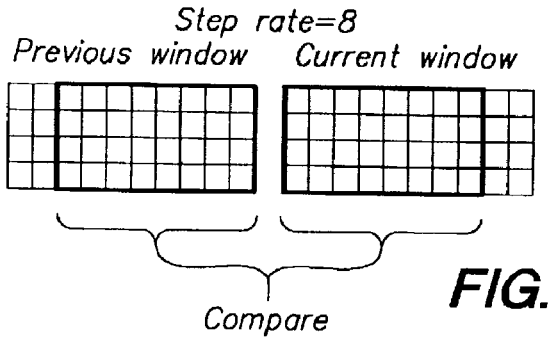
Figure 12C:
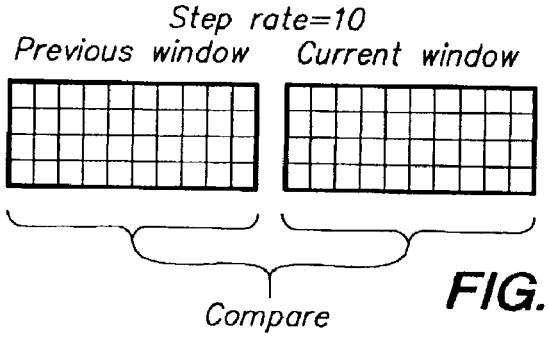
Figures 13, 15:
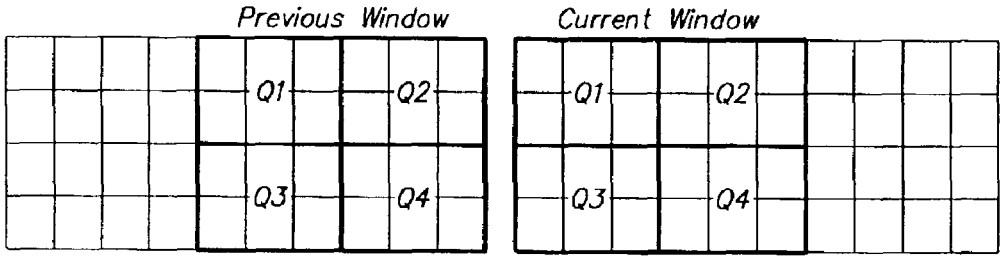
FIG. 13 provides a truth table outlining the manner of changing a step rate in response to comparison of image blocks at step rates of 6, 8 and 10 pixels per step.
FIG. 15 illustrates the division of a window into quadrants.

Once the windows are loaded, the matching and encoding module (1012) comes into play by first checking for an exact match between pixels in a current window (1024) and pixels in the window which immediately preceded the current window—referred to as the previous window (1022). Often, printed data will exhibit a repetitious nature depending on the nature of the font used to generate the text or the half-tone matrix that was used to render the image. Accordingly, the current and previous windows are compared using the different step rates (6, 8 and 10 pixels) in an attempt to identify this natural repetition. FIGS. 12(a),(b) and (c) illustrate the specific basis for comparison using step rates of 6, 8 and 10, respectively The step rate of the window loading logic may initially be set at 8 pixels per step. If the above comparison step indicates that this step rate is out of sync with the natural cycle of data in the strip, the step rate is changed. FIG. 13 provides a truth table indicating the specific manner in which the step rate is changed. For instance, in the case where the step rate is initially set at 8, a match at window length of 8 will require no change in the step rate. However, if a match occurs at a window length of 6 pixels, then the table instructs the compression unit (1002) to switch to a lower step rate of 6. Similarly, if a match occurs at a window length of 10 pixels, then the table instructs the system to switch to a higher step rate of 10. If none of the step rates produces a match, then the table instructs the system to maintain the current step rate. Furthermore, if there is a match for a specific window which comprises all white or all black pixels (denoted in the table as CV* for "Constant Value"), the table instructs the system to maintain the current step rate. More specifically, in the event of a constant value window, a change in step rate is inhibited to allow a more consistent lock on the half-tone frequency.

Having chosen the step rate, the matching and encoding module (1012) begins the task of actually coding the windows for transmission. It begins by dividing the window into quadrants, as denoted as step 1030 in FIG. 14, and as illustrated schematically in FIG. 15 (showing quadrant divisions using a step rate of 6 pixels per step).

In general, the matching and encoding module (1012) employs three principal hierarchical phases in coding the quadrants. First, the module (1012) compares a current quadrant from the current window with the immediately proceeding quadrant from the previous window. If a match is found, pixel values comprising the current quadrant do not have to be included in the output data stream.

If a match is unavailing, however, the encoding module (1012) enters the second phase of its examination. In the second phase, the unmatched current quadrant is compared with a stored list of previously encountered image quadrants, starting from the second-to-last recently encountered image quadrant (the immediately proceeding image quadrant having already been checked, as described above). If a match is found between the current quadrant, and an entry on the list, then the quadrant is coded by making reference to the entry on the list.

If a match is still unavailing, the encoding module (1012) enters the third phase of its examination. In the third phase, the unmatched current quadrant is examined to determine if it falls into one of the following categories: bilevel text, bilevel image, one-gray value image, and multiple gray value image (to be described in more detail below). If so, the image is assigned a code corresponding to its ascertained classification. For instance, if the text consists only of bilevel text, only the most significant bits of the 3-bit pixels are transmitted, thereby significantly reducing the quantity of information included in the output data stream.

Figure 17:
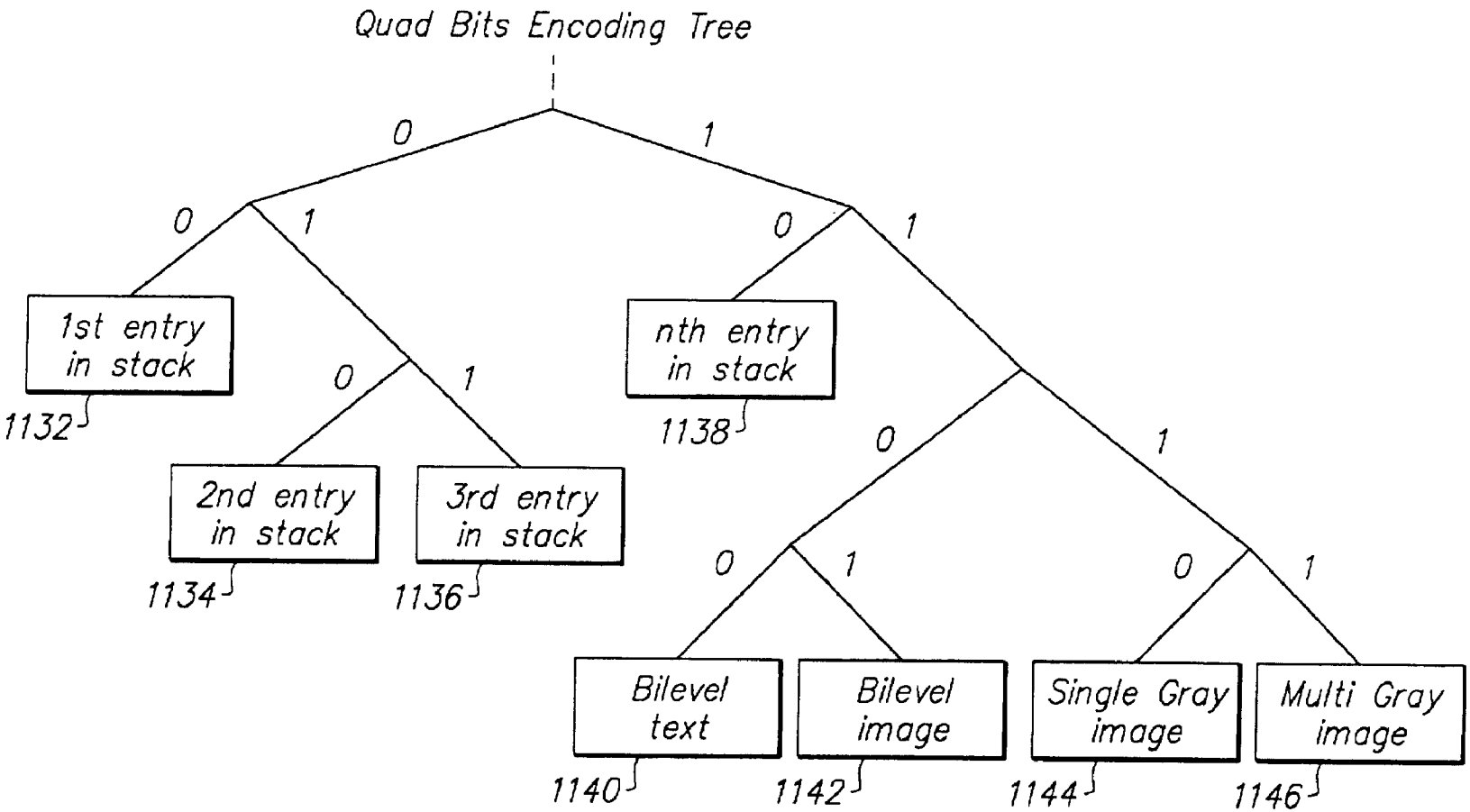
FIG. 17 shows a tree level representation of different quadrant bit matching possibilities.

The overall goal of the matching and encoding module (1012) is to assign the shortest code possible to each quadrant. This is accomplished using a form of Huffman encoding, as illustrated in FIG. 17. All of the different situations that might be encountered within a window quadrant are classified into a predetermined number of categories, or possibilities (1132-1146), which form the terminal parts of an encoding tree. Each quadrant possibility (1132-1146) is assigned a code, which may be determined by tracing the encoding tree from its root to one of the quadrant possibilities (1132-1146). The code is assembled from the individual bits assigned to each branch of the tree. According to a particularly beneficial feature of the present invention, the shortest codes are allocated to the most frequently occurring quadrant possibilities. For instance, the current window has the highest probability of matching the immediately proceeding window. In this circumstance, the encoding module (1012) simply informs the decoding module (not shown) of this fact, and does not transmit any of the pixel values in the matching quadrant. The next highest probability corresponds to the second-to-last encountered image quadrant, represented as (1132) in FIG. 17, and coded as [00]. The next highest probability of match correspond to the third-to-last encountered image quadrant (1134), and then the fourth-to-last image quadrant (1136), which are coded as [010] and [011], respectively. If the matching and encoding module fails to find a match in a previous quadrant, it will then classify the quadrant as bilevel text (1140), bilevel image (1142), single gray image (1144) or a multiple gray image (1146), assigned the codes [1100], [1101], [1110] and [1111], respectively. Note that the possibilities corresponding to the highest probabilities are assigned the shortest codes.

Having presented an overview of the functions performed by the encoding module (1012), each of the three above-identified principal phases will be discussed in detail.

Figure 14:
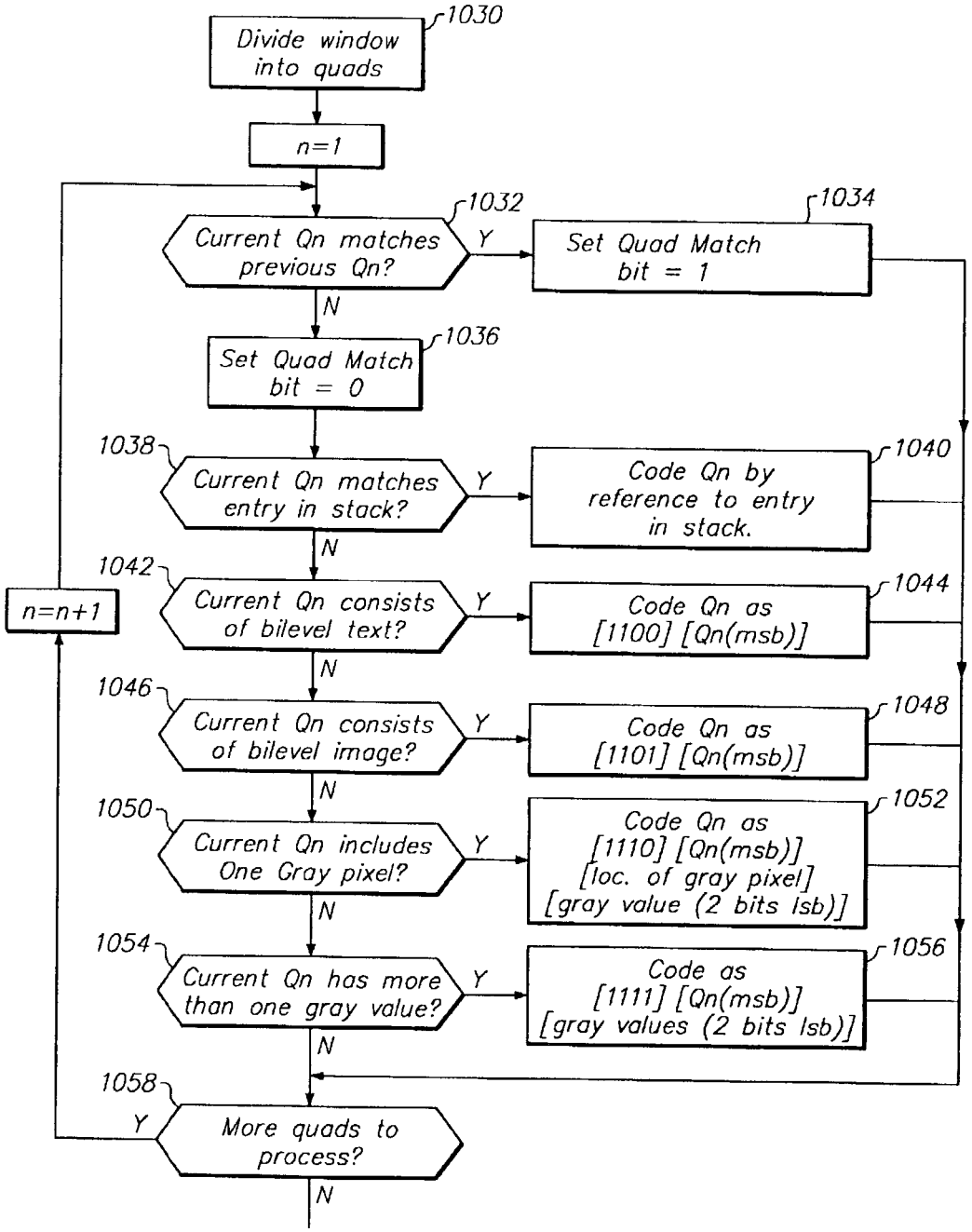
FIG. 14 is a flow chart indicating the principal steps in the algorithm performed by the matching and encoding module (12)

As part of the first phase, the matching and encoding module ((1012 in FIG. 10)) compares a quadrant taken from the current window with its respective counterpart quadrant taken from the previous window (step 1032 in FIG. 14). If they match, a Quad Match bit corresponding to that quadrant is set to 1 (Step 1032). Otherwise, this bit is set to 0 (Step 1036). This procedure is repeated for the quadrants to produce a series of Quad Match bits. Only the image data within the quadrants assigned a Quad Match bit of 0 need to be transmitted in the output data stream. Furthermore, if the series of Quad Match bits duplicates a previous series of Quad Match bits, these bits do not have to be transmitted.

Specific exemplary coding for these two situations follows:

(1) Encoding in the case of unmatching Quad Match Bits: [1][Quad Match bits][Q1][Q2][Q3][Q4]

(2) Encoding in the case of matching Quad Match Bits: [0][Q1][Q2][Q3][Q4]

Here, Q1-Q4 represents the pixel data contained within quadrants 1-4, respectively. As noted above, if one of the Quad Match bits indicates that one of the quadrants matches its counterpart from the previous window, that quadrant does not have to be transmitted with the output data stream. For example, if the Quad Match bits are [1010], the image data for the quadrants Q1 and Q3 are not included in the output data stream.

In the case (1) of encoding for the case of unmatched Quad Match bits, the current set of Quad Match bits does not match the previous set of Quad Match bits. Therefore, the new series of Quad Match bits has to be transmitted. In the case (2) of encoding for the case of matched Quad Match bits, the current set of Quad Match bits matches the previous set of Quad Match bits. Therefore, the new series of Quad Match bits does not have to be transmitted. Cases (1) and (2) are distinguished by using the prefix codes [1] and [0].

In attempt to further compress the current window, the unmatched quadrants are compared with a stack (1014) containing a list of most recently used image data (step 1038 of FIG. 14). The stack (1014) is specifically comprised of four different stacks, each holding data corresponding to quadrants 1-4, respectively and each being implemented according to the invention.

Figure 16:
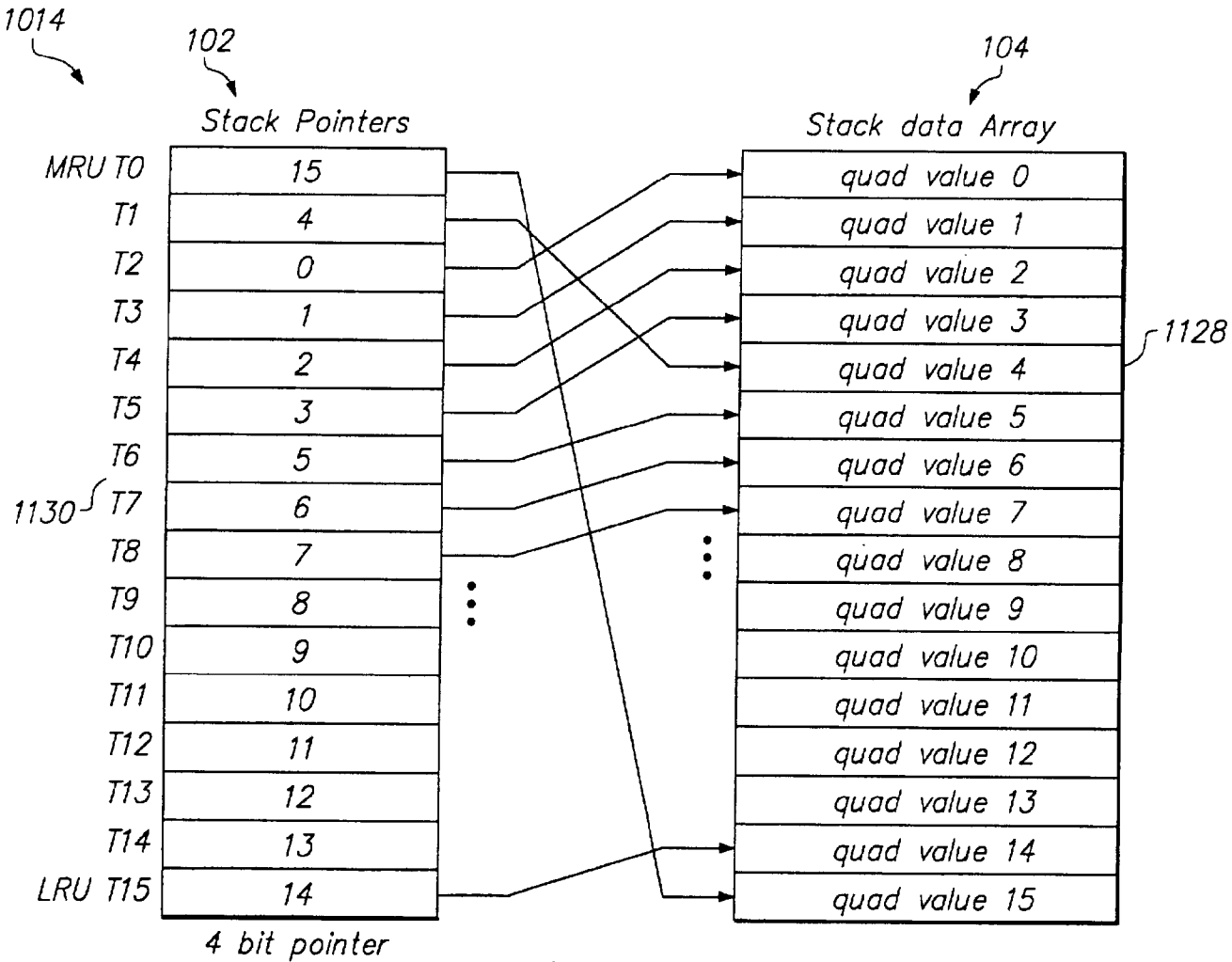
FIG. 16 shows the organization of the information in one of the four sections of the stack RAM (14)

As illustrated in FIG. 16, each stack consists of 16 elements storing data (1128) corresponding to the last 16 image quadrants encountered. Any item in the stack can be promoted to the most recently used position—or top—of the stack. Any new item inserted into the stack causes the least recently used item (LRU) to conceptually fall off the bottom of the stack and all other items to shift down one position. In this manner, each quadrant stack eventually contains the 16 most recently used quad bit values for that specific quadrant in order from most recently used (MRU) to least recently used (LRU).

As readily understood by those skilled in the art, the stack data is not actually shifted in response to promotion or demotion of entries in the stack. Rather, pointers (1130) to the stack entries are manipulated to indicate the ordering of the stack. For instance, an item may be promoted from any level within the stack to the MRU by loading the pointer from that level, Tn, into the T0 slot, and shifting all the pointers from T0 to Tn−1 down one level. Inserting a new item into the stack is essentially the same as promoting the pointer in T15 to the top and storing the new item's data at that pointer's location.

The matching and encoding module searches the selected stack from the most recently used data to the least recently used data. For instance, FIG. 16 indicates that a quadrant from one recently encountered window matched the entry stored in "quad value 4". At the time of the match, a pointer to quad value 4 was stored in position T0 of the pointer table (1130). In a subsequent window, however, the stack did not contain a match for the current quadrant. This resulted in storing the nonmatched quadrant at location 15, promoting location 15 to the top of the pointer list, and shifting the match for quadrant value 4 down one level to location T1 in the pointer table (1130).

If in fact a quadrant from the current window matches a quadrant stored in the stack, the current quadrant is coded (Step 12) according to the following rules:

(3) Encoding of quad if matching 1st entry in stack: [00]

(4) Encoding of quad if matching 2nd entry in stack: [010]

(5) Encoding of quad if matching 3rd entry in stack: [011]

(6) Encoding of quad if matching 4th-16th entry in stack: [10][4-bit stack index]

The specific codes assigned to each match derive from the Huffman tree encoding of the different permutations of quadrant bits, as illustrated in FIG. 17, and as discussed above.

Finally, if the quadrant data does not match a previous window and is further not found in the stack, the actual bit data must be sent. However, if all of the data in the quad is bilevel, only the most significant bit of each pixel need to be sent to define the quadrant (steps S1042 and 1044 in FIG. 14). If the bilevel data is all text then the coding is as follows:

(7) Encoding for bilevel text quad: [1100][bilevel quad bit values]

Again, the specific code [1100] is derived from the Huffman tree encoding as outlined in FIG. 17. The quad bit values consist of only the most significant bit of each pixel, to indicate whether the respective pixels are black or white.

If the bilevel quadrant contains at least one bilevel image pixel, then the entire quadrant is coded as a bilevel image (steps 1046 and 1048). Any bilevel text contained with this quadrant is coded as bilevel image data. From the standpoint of pixel values, bilevel image data is the same as bilevel text data. For example, each pixel in both cases is coded as either black or white. It is possible, therefore, to encode all bilevel image data together. However, in some situations image data undergoes processing that is not carried out on text data, and vice versa. For example, image enhancement techniques, such as anti-aliasing, might be performed on text data after it is decoded, but are typically not carried out with respect to image data. For this reason, it is preferable to encode bilevel image data separately from the text. Bilevel image data may be discriminated from bilevel text by assigning a tag to the data at the time of creation (according to one example). Again it is emphasized that the term "bilevel text" encompasses not only text data, but also text-like data (such as graphical art). Generally speaking, "bilevel text" data is everything that is not "bilevel image" data.

The specific coding for bilevel imaging is a follows:

(8) Encoding for bilevel image quad: [1101][bilevel quad bit values]

Again, the quad bits values consist of only the most significant bit of the 3-bit pixel values.

If the quadrant contains only one gray pixel value among the black and white pixels (step 1050), the coding for the quadrant includes a location index providing the location of the gray value within the quadrant, as well as the gray pixel's least two significant bits (step 1052). Also, the values of the bilevel data must be transmitted. The complete coding is as follows:

(9) Encoding for one gray value quad: [1110][bilevel quad bit values][location index][gray value]

Finally, if the quadrant contains more than one gray value, it is more effective to simply transmit the complete quadrant, rather than specifying the location of the gray values within the quadrant (steps 1054 and 1056). Specifically:

(10) Encoding for multiple gray quad: [1111][bilevel quad bit values][2-bit least sig. bit values].

In addition to the above basic codes, the matching and encoding module produces two additional special codes. The first is to signal to the decoder (not shown) that a step change is required. This code is indicated as follows:

(11) Encoding for change in step rate: [1][0011 or 1100][1][Q1][Q2][Q3][Q4]

The code [0011] is used to inform the decoder of a higher step rate, while the code [1100] is used to inform the decoder of a lower step rate. Again, Q1-Q4 refers to the quadrant bits for quadrants 1-4, respectively. In this mode, all Quad Match bits are forced to [0000] and not included in the data stream.

A second special situation occurs when the Quad Match bits resemble the encode lower or encode higher bits identified above—[1100] or [0011], respectively. To distinguish this situation from the preceding case, the Quad Match bits are followed by a 0-bit to indicate that this really is a normal new tree encoding and not a step rate change. The code is thus as follows:

(12) Encoding for special situation: [1][Quad Match bits][0][Q1][Q2][Q3][Q4].

Once the matching and encoding module has completed its task, it looks to see if the output module has set a barrel_ready signal, indicating that the barrel shifter (not shown) of the output module (1016) is ready to receive the coded data stream. If so, the coded data stream is forwarded to the output module (1016) which packs the data into 32-bit words to be loaded into the output FIFO (1018) using the barrel shifter.

The output module (1016) forwards the expanded codes to the output FIFO (1018), which like the input FIFO, contains two memory sections. While one section is being loaded by the barrel shifter, the other section, if full, is written out to the system DRAM. The output FIFO sets an output FIFO full bit to inform the interface logic to write the output bit stream to the system DRAM.

The order of steps given in FIG. 14 is not crucial to the inventive premise, nor are the particular choice of coding prefixes or window lengths.

The encoding system described with reference to FIGS. 10-17 is an example of a system that can employ a stack implemented according to the invention. Other systems and methods not described herein can also advantageously employ the invention. The description of the encoding system herein is not intended to limit the spirit or scope of the present invention in any manner.

Further, various changes and modifications will be apparent to those skilled in art. Unless these modifications and changes depart from the scope and spirit of the present invention, they are considered encompassed by the present invention. Therefore, it is the object of the appended claims to cover all such variations and modifications as come within the true spirit and scope of the invention.

I claim:

1. An apparatus for [an] *a most recently used* (MRU) stack, said apparatus directly or indirectly connected to a stack search requesting unit, stack search requesting unit specifying a command and a data value to said MRU stack, said apparatus comprising:

means for receiving a command;

means for receiving a data value;

a stack data module for storing one or more stack data values, said stack data module being coupled to said data value receiving means for receiving a data value as input;

a stack pointer module for referencing stack data values stored in said stack data module, said stack pointer module being coupled to said stack data module to provide as input a reference to one or more stack data values, said stack pointer module including a set of data multiplexers, including one or more multiplexers, a set of registers, including one or more registers wherein an MRU register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, the registers in said set of registers arranged and interconnected by the multiplexers such that data values are specified from a most-recently-used data value down to a least-recently-used data value; and a stack control module for the MRU stack, said stack control module being coupled to said command receiving means for receiving a command as input and further being arranged to transmit an output to the stack search requesting unit, said stack control module further being coupled to said stack pointer module to provide operational control of the stack pointer module functions, said stack control module further being coupled to said stack data module to provide control of the accessing of data to and from the stack data module and to receive as input a stack data value, said stack control module further being coupled to said data value receiving means for receiving a data value as input.

2. An apparatus as defined in claim 1 wherein said multiplexers are further arranged such that said multiplexer corresponding to said MRU register receives as input an initialization value and an input from each register in the set of registers, including itself, and other multiplexers in said set of data multiplexers receive as input an initialization value, data from the preceding register and data from itself.

3. An apparatus for [an] *a most recently used* (MRU) stack, said apparatus comprising:

means for specifying a command;

means for specifying a data value;

a stack data module for storing one or more stack data values, said stack data module being coupled to said data value specifying means for receiving a data value as input;

a stack pointer module for referencing stack data values stored in said stack data module, said stack pointer module being coupled to said stack data module to provide as input a reference to one or more stack data values, said stack pointer module including a set of data multiplexers, including one or more multiplexers, a set of registers, including one or more registers wherein an MRU register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, said multiplexers further arranged such that the multiplexer corresponding to said MRU register receives as input an initialization value and an input from each register in the set of registers, including itself, and the other multiplexers in said set of data multiplexers receive as input an initialization value, data from the preceding register and data from itself; and a stack control module for the MRU stack, said stack control module being coupled to said command specifying means for receiving a command as input and further being arranged to transmit an output to a stack search requesting unit, said stack control module further being coupled to said stack pointer module to provide operational control of the stack pointer module functions, said stack control module further being coupled to said stack data module to provide control of the accessing of data to and from the stack data module and to receive as input a stack data value, said stack control module further being coupled to said data value specifying means for receiving a data value as input.

4. An apparatus for [an] *a most recently used* (MRU) stack, said apparatus directly or indirectly connected to a stack search requesting unit, stack search requesting unit specifying a command and a data value to said MRU stack, said apparatus comprising:

means for receiving a command;

means for receiving a data value;

a stack data module for storing one or more stack data values, said stack data module being coupled to said data value receiving means for receiving a data value as input;

a stack pointer module for referencing stack data values stored in said stack data module, said stack pointer module being coupled to said stack data module to provide as input a reference to one or more stack data values, said stack pointer module including a set of data multiplexers, including one or more multiplexers, a set of registers, including one or more registers wherein an MRU register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, the registers in said set of registers arranged and interconnected by the multiplexers such that data values are specified from a most-recently-used data value down to a least-recently-used data value and such that a data value can be inserted into the stack or promoted to the top of the stack within two or less clock cycles; and a stack control module for the MRU stack, said stack control module being coupled to said command receiving means for receiving a command as input and further being arranged to transmit an output to the stack search requesting unit, said stack control module further being coupled to said stack pointer module to provide operational control of the stack pointer module functions, said stack control module further being coupled to said stack data module to provide control of the accessing of data to and from the stack data module and to receive as input a stack data value, said stack control module further being coupled to said data value receiving means for receiving a data value as input.

5. An apparatus as defined in claim 4 wherein said multiplexers are further arranged such that said multiplexer corresponding to said MRU register receives as input an initialization value and an input from each register in the set of registers, including itself, and other multiplexers in said set of data multiplexers receive as input an initialization value, data from the preceding register and data from itself.

6. A method for manipulating data in a stack, said stack including a stack data module for storing one or more stack data values, said stack further including a stack pointer module, said stack pointer module being coupled to said stack data module to provide as input a reference to one or more stack data values, said method comprising the steps of:

searching for an item in the stack data module using the stack pointer module, the stack pointer *module* including a set of data multiplexers, including one or more multiplexers, a set of registers, including one or more registers wherein [an] *a most recently used* (MRU) register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, the registers in said set of registers arranged and interconnected by the multiplexers such that data values arespecified from a most-recently-used data value down to a least-recently-used data value;

if the item is found in the stack data, then promoting the item such that the item is identified as being the most-recently-used; and if the item is not found in the stack data, then inserting the item into the stack such that the item is identified as being the most-recently-used.

7. A method for manipulating data in a stack, said stack including a stack data module for storing one or more stack data values, said stack further including a stack pointer module, said stack pointer module being coupled to said stack data module to provide as input a reference to one or more stack data values, said method comprising the steps of:

searching for an item in the stack data module using the stack pointer module said stack pointer module including a set of data multiplexers, including one or more multiplexers, a set of registers, including one or more registers wherein [an] *a most recently used* (MRU) register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, said multiplexers further arranged such that the multiplexer corresponding to said MRU register receives as input an initialization value and an input from each register in the set of registers, including itself, and the other multiplexers in said set of data multiplexers receive as input an initialization value, data from the preceding register and data from itself;

if the item is found in the stack data, then promoting the item such that the item is identified as being the most-recently-used; and if the item is not found in the stack data, then inserting the item into the stack such that the item is identified as being the most-recently-used.

8. A method for manipulating data in a stack, said stack including a stack data module for storing one or more stack data values, said stack further including a stack pointer module, said stack pointer module being coupled to said stack data module to provide as input a reference to one or more stack data values, said method comprising the steps of:

searching for an item in the stack data module using the stack pointer module, the stack pointer module including a set of data multiplexers, including one or more multiplexers, a set of registers, including one or more registers wherein [an] *a most recently used* (MRU) register specifics, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, the registers in said set of registers arranged and interconnected by the multiplexers such that data values are specified from a most-recently-used data value down to a least-recently-used data value and such that a data value can be inserted into the stack or promoted to the top of the stack within two or less clock cycles;

if the item is found in the stack data, then promoting the item such that the item is identified as being the most-recently-used; and if the item is not found in the stack data, then inserting the item into the stack such that the item is identified as being the most-recently-used.

9. A method as defined in claim 8, wherein said promoting of the item occurs during a single clock cycle.

10. A method as defined in claim 8, wherein said inserting of the item occurs during a single clock cycle.

11. A method as defined in claim 8, wherein promoting the item or inserting the item occurs in two or less clock cycles.

12. A method as defined in claim 8 wherein said multiplexers are further arranged such that said multiplexer corresponding to said MRU register receives as input an initialization value and an input from each register in the set of registers, including itself, and other multiplexers in said set of data multiplexers receive as input an initialization value, data from the preceding register and data from itself.

13. A method as defined in claim 8, wherein said step of promoting the item comprises the steps of:

setting the MRU stack pointer to the value of the stack pointer specifying the stack data value matching the item; and shifting down one the values of the stack pointers in the stack pointer list between the MRU stack pointer and stack pointer specifying the stack data value matching the item, noninclusive, wherein said steps of setting the MRU stack pointer and shifting are executed simultaneously.

14. A method as defined in claim 8, wherein said step of inserting the item comprises the steps of:

setting the MRU stack pointer to the value specified by the LRU stack pointer;

shifting down one the values of the other stack pointers in the stack pointer list; and setting the stack data value referenced by the MRU stack pointer equal to the item, wherein said steps of setting the MRU stack pointer and shifting are performed simultaneously.

15. A method for manipulating data in a stack, said stack including stack data having one or more stack data values, said stack further including a stack pointer list having a set of references, the set of references including one or more stack pointers, each stack pointer *stored in a clocked register and* uniquely specifying a stack data value in the stack data, the one or more stack pointers including [an] *a most recently used* (MRU) stack pointer specifying the most-recently-used stack data value in the stack data and [an] *a least recently used* (LRU) stack pointer specifying the least-recently-used stack data value in the stack data, the stack pointers in said set of references such that stack data values are specified from a most-recently-used data value down to a least-recently-used data value, said method comprising the steps of:

searching for an item in the stack data;

if the item is found in the stack data, then promoting the item such that the item is identified as being the most-recently-used, the promoting of the item occurring during a single clock cycle; and if the item is not found in the stack data, then inserting the item into the stack such that the item is identified as being the most-recently-used, the inserting of the item occurring during a single clock cycle.

16. A method as defined in claim 15, wherein said step of promoting the item comprises the steps of:

setting the MRU stack pointer to the value of the stack pointer specifying the stack data value matching the item; and shifting down one the values of the stack pointers in the stack pointer list between the MRU stack pointer and stack pointer specifying the stack data value matching the item, noninclusive, wherein said steps of setting the MRU stack pointer and shifting are executed simultaneously.

17. A method for manipulating data in a stack, said stack including stack data having one or more stack data values, said stack further including a stack pointer list having a set of references, the set of references including one or more stack pointers, each stack pointer *stored in a clocked register and* uniquely specifying a stack data value in the stack data, the one or more stack pointers including [an] *a most recently used* (MRU) stack pointer specifying the most-recently-used stack data value in the stack data and [an] *a least recently used* (LRU) stack pointer specifying the least-recently-used stack data value in the stack data, the stack pointers in said set of references such that stack data values are specified from a most-recently-used data value down to a least-recently-used data value, said method comprising the steps of:

searching for an item in the stack data;

if the item is found in the stack data, then promoting the item such that the item is identified as being the most-recently-used, the promoting of the item occurring during a single clock cycle; and if the item is not found in the stack data, then inserting the item into the stack such that the item is identified as being the most-recently-used.

18. A method as defined in claim 17, wherein said step of promoting the item comprises the steps of:

setting the MRU stack pointer to the value of the stack pointer specifying the stack data value matching the item; and shifting down one the values of the stack pointers in the stack pointer list between the MRU stack pointer and stack pointer specifying the stack data value matching the item, noninclusive, wherein said steps of setting the MRU stack pointer and shifting are executed simultaneously.

19. A method for manipulating data in a stack, said stack including stack data having one or more stack data values, said stack further including a stack pointer list having a set of references, the set of references including one or more stack pointers, each stack pointer *stored in a clocked register and* uniquely specifying a stack data value in the stack data, the one or more stack pointers including [an] *a most recently used* (MRU) stack pointer specifying the most-recently-used stack data value in the stack data and [an] *a least recently used* (LRU) stack pointer specifying the least-recently-used stack data value in the stack data, the stack pointers in said set of references such that stack data values are specified from a most-recently-used data value down to a least-recently-used data value, said method comprising the steps of:

searching for an item in the stack data;

if the item is found in the stack data, then promoting the item such that the item is identified as being the most-recently-used; and if the item is not found in the stack data, then inserting the item into the stack such that the item is identified as being the most-recently-used, the inserting of the item occurring during two or less clock cycles.

20. A method as defined in claim 19, wherein said step of inserting the item comprises the steps of:

setting the MRU stack pointer to the value specified by the LRU stack pointer;

shifting down one the values of the other stack pointers in the stack pointer list; and setting the stack data value referenced by the MRU stack pointer equal to the item, wherein said steps of setting the MRU stack pointer and shifting are performed simultaneously.

21. A method for manipulating data in a stack, said stack including a stack data module for storing one or more stack data values, said stack further including a stack pointer module, said stack pointer module being coupled to said stack data module to provide as input a reference to one or more stack data values, said method comprising the steps of:

searching for an item in the stack data module using the stack pointer module, the stack pointer module including a set of data multiplexers, including one or more multiplexers, a set of registers, including one or more registers wherein [an] *a most recently used* (MRU) register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, the registers in said set of registers arranged and interconnected by the multiplexers such that data values are specified from a most-recently-used data value down to a least-recently-used data;

if the item is found in the stack data, then promoting the item such that the item is identified as being the most-recently-used, the pointer manipulation associated with the promoting of the item occurring during a single clock cycle; and if the item is not found in the stack data, then inserting the item into the stack such that the item is identified as being the most-recently-used, the pointer manipulation associated with the inserting of the item occurring during a single clock cycle.

22. A method as defined in claim 21, wherein said step of promoting the item comprises the steps of:

setting the MRU stack pointer to the value of the stack pointer specifying the stack data value matching the item; and shifting down one the values of the stack pointers in the stack pointer list between the MRU stack pointer and stack pointer specifying the stack data value matching the item, noninclusive, wherein said steps of setting the MRU stack pointer and shifting are executed simultaneously.

23. A method for manipulating data in a stack, said stack including a stack data module for storing one or more stack data values, said stack further including a stack pointer module, said stack pointer module being coupled to said stack data module to provide as input a reference to one or more stack data values, said method comprising the steps of:

searching for an item in the stack data module using the stack pointer module, the stack pointer module including a set of data multiplexers, including one or more multiplexers, a set of registers, including one or more registers wherein [an] *a most recently used* (MRU) register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, the registers in said set of registers arranged and interconnected by the multiplexers such that data values are specified from a most-recently-used data value down to a least-recently-used data;

if the item is found in the stack data, then promoting the item such that the item is identified as being the most-recently-used, pointer manipulation associated with the promoting of the item occurring during a single clock cycle; and if the item is not found in the stack data, then inserting the item into the stack such that the item is identified as being the most-recently-used.

24. A method as defined in claim 23, wherein said step of promoting the item comprises the steps of:

setting the MRU stack pointer to the value of the stack pointer specifying the stack data value matching the item; and shifting down one the values of the stack pointers in the stack pointer list between the MRU stack pointer and stack pointer specifying the stack data value matching the item, noninclusive, wherein said steps of setting the MRU stack pointer and shifting are executed simultaneously.

25. A method for manipulating data in a stack, said stack including a stack data module for storing one or more stack data values, said stack further including a stack pointer module, said stack pointer module being coupled to said stack data module to provide as input a reference to one or more stack data values, said method comprising the steps of:

searching for an item in the stack data module using the stack pointer module, the stack pointer module including a set of data multiplexers, including one or more multiplexers, a set of registers, including one or more registers wherein [an] *a most recently used* (MRU) register specifies, either directly or indirectly, a location of a most-recently-used stack data value and [an] *a least recently used* (LRU) register specifies, either directly or indirectly, a location of a least-recently-used stack data value, and an address multiplexer, said data multiplexers and registers configured such that for each register in the set of registers, there is a corresponding multiplexer in the set of data multiplexers, said corresponding multiplexer arranged and coupled to its corresponding register to receive one or more inputs and provide an output to the corresponding register, the registers in said set of registers arranged and interconnected by the multiplexers such that data values are specified from a most-recently-used data value down to a least-recently-used data;

if the item is found in the stack data, then promoting the item such that the item is identified as being the most-recently-used; and if the item is not found in the stack data, then inserting the item into the stack such that the item is identified as being the most-recently-used, the pointer manipulation associated with the inserting of the item occurring during a single clock cycle.

26. An apparatus for [an] *a most recently used* (MRU) stack, said apparatus comprising:

means for receiving a command;

means for receiving a data value;

a stack data module for storing one or more stack data values, said stack data module being coupled to said data value receiving means for receiving a data value as input;

a stack pointer module for referencing stack data values stored in said stack data module, said stack pointer module being coupled to said stack data module to provide as input a reference to one or more stack data values, said stack pointer module including a stack pointer list [having a set of references, the set of references including one or more stack pointers, each stack pointer uniquely specifying a stack data value in the stack data] *that includes a set of one or more clocked registers, each clocked register specifying a stack pointer that uniquely references a stack data value in the stack data module*, the one or more stack pointers including an MRU stack pointer specifying the most-recently-used stack data value in the stack data and [an] *a least recently used* (LRU) stack pointer specifying the least-recently-used stack data value in the stack data, the stack pointers in said set of references such that stack data values are specified from a most-recently-used data value down to a least-recently-used data value, said stack pointer module and said stack data module interconnected to allow pointer manipulation associated with the promotion of an item to the top of the stack to occur during a single clock cycle and to allow pointer manipulation associated with the insertion of an item into the stack to occur during a single clock cycle; and a stack control module for the MRU stack, said stack control module being coupled to said command receiving means for receiving a command as input and further being arranged to transmit an output to a stack search requesting unit, said stack control module further being coupled to said stack pointer module to provide operational control of the stack pointer module functions, said stack control module further being coupled to said stack data module to provide control of the accessing of data to and from the stack data module and to receive as input a stack data value, said stack control module further being coupled to said data value receiving means for receiving a data value as input.

[27. An apparatus as defined in claim 26, wherein said stack pointer list includes a set of registers, each register specifying a stack pointer that references a unique stack data value in the stack data module.]

28. An apparatus as defined in claim 26, wherein said stack data module is a memory array having one or more array cells, each cell specifying a stack data value.

29. An apparatus for [an] *a most recently used* (MRU) stack, said apparatus comprising:

means for receiving a command;

means for receiving a data value;

a stack data module for storing one or more stack data values, said stack data module being coupled to said data value receiving means for receiving a data value as input;

a stack pointer module for referencing stack data values stored in said stack data module, said stack pointer module being coupled to said stack data module to provide as input a reference to one or more stack data values, said stack pointer module including a stack pointer list [having a set of references, the set of references including one or more stack pointers, each stack pointer uniquely specifying a stack data value in the stack data] *that includes a set of one or more clocked registers, each clocked register specifying a stack pointer that uniquely references a stack data value in the stack data module*, the one or more stack pointers including an MRU stack pointer specifying the most-recently-used stack data value in the stack data and [an] *a least recently used* (LRU) stack pointer specifying the least-recently-used stack data value in the stack data, the stack pointers in said set of references such that stack data values are specified from a most-recently-used data value down to a least-recently-used data value, said stack pointer module and said stack data module interconnected to allow pointer manipulation associated with the promotion of an item to the top of the stack to occur during a single clock; and a stack control module for the MRU stack, said stack control module being coupled to said command receiving means for receiving a command as input and further being arranged to transmit an output to a stack search requesting unit, said stack control module further being coupled to said stack pointer module to provide operational control of the stack pointer module functions, said stack control module further being coupled to said stack data module to provide control of the accessing of data to and from the stack data module and to receive as input a stack data value, said stack control module further being coupled to said data value receiving means for receiving a data value as input.

[30. An apparatus as defined in claim 29, wherein said stack pointer list includes a set of registers, each register specifying a stack pointer that references a unique stack data value in the stack data module.]

31. An apparatus as defined in claim 29, wherein said stack data module is a memory array having one or more array cells, each cell specifying a stack data value.

32. An apparatus for [an] *a most recently used* (MRU) stack, said apparatus comprising:

means for receiving a command;

means for receiving a data value;

a stack data module for storing one or more stack data values, said stack data module being coupled to said data value receiving means for receiving a data value as input;

a stack pointer module for referencing stack data values stored in said stack data module, said stack pointer module being coupled to said stack data module to provide as input a reference to one or more stack data values, said stack pointer module including a stack pointer list [having a set of references, the set of references including one or more stack pointers, each stack pointer uniquely specifying a stack data value in the stack data] *that includes a set of one or more clocked registers, each clocked register specifying a stack pointer that uniquely references a stack data value in the stack data module*, the one or more stack pointers including an MRU stack pointer specifying the most-recently-used stack data value in the stack data and [an] *a least recently used* (LRU) stack pointer specifying the least-recently-used stack data value in the stack data, the stack pointers in said set of references such that stack data values are specified from a most-recently-used data value down to a least-recently-used data value, said stack pointer module and said stack data module interconnected to allow a data value to be inserted into the stack in a single clock cycle; and a stack control module for the MRU stack, said stack control module being coupled to said command receiving means for receiving a command as input and further being arranged to transmit an output to a stack search requesting unit, said stack control module further being coupled to said stack pointer module to provide operational control of the stack pointer module functions, said stack control module further being coupled to said stack data module to provide control of the accessing of data to and from the stack data module and to receive as input a stack data value, said stack control module further being coupled to said data value receiving means for receiving a data value as input.

[33. An apparatus as defined in claim 32, wherein said stack pointer list includes a set of registers, each register specifying a stack pointer that references a unique stack data value in the stack data module.]

34. An apparatus as defined in claim 32, wherein said stack data module is a memory array having one or more array cells, each cell specifying a stack data value.

35. A computer readable medium having stored thereon instructions for causing a computer to implement the following steps:

searching for an item in a stack, the stack including stack data having one or more stack data values, the stack further including a stack pointer list [having a set of references, the set of references including one or more stack pointers, each stack pointer uniquely specifying a stack data value in the stack data] *that includes a set of one or more clocked registers, each clocked register specifying a stack pointer that uniquely references a stack data value in the stack data module*, the one or more stack pointers including [an] *a most recently used* (MRU) stack pointer specifying the most-recently-used stack data value in the stack data and [an] *a least recently used* (LRU) stack pointer specifying the least-recently-used stack data value in the stack data, the stack pointers in the set of references such that stack data values are specified from a most-recently-used data value down to a least-recently-used data value;

if the item is found in the stack data, then promoting the item such that the item is identified as being the most-recently-used, the promoting of the item occurring during a single clock cycle; and if the item is not found in the stack data, then inserting the item into the stack such that the item is identified as being the most-recently-used, the inserting of the item occurring during a single clock cycle.

36. A computer readable medium as defined in claim 35, wherein said step of promoting the item comprises the steps of:

setting the MRU stack pointer to the value of the stack pointer specifying the stack data value matching the item; and shifting down one the values of the stack pointers in the stack pointer list between the MRU stack pointer and stack pointer specifying the stack data value matching the item, noninclusive, wherein said steps of setting the MRU stack pointer and shifting are executed simultaneously.

37. A computer readable medium having stored thereon instructions for causing a computer to implement the following steps:

searching for an item in a stack, the stack including stack data having one or more stack data values, the stack further including a stack pointer list [having a set of references, the set of references including one or more stack pointers, each stack pointer uniquely specifying a stack data value in the stack data] *that includes a sets of one or more clocked registers, each clocked register specifying a stack pointer that uniquely references a stack data value in the stack data module*, the one or more stack pointers including [an] *a most recently used* (MRU) stack pointer specifying the most-recently-used stack data value in the stack data and [an] *a least recently used* (LRU) stack pointer specifying the least-recently-used stack data value in the stack data, the stack pointers in the set of references such that stack data values are specified from a most-recently-used data value down to a least-recently-used data value;

if the item is found in the stack data, then promoting the item such that the item is identified as being the most-recently-used, pointer manipulation associated with the promoting of the item occurring during a single clock cycle; and if the item is not found in the stack data, then inserting the item into the stack such that the item is identified as being the most-recently-used, pointer manipulation associated with the inserting of the item occurring during a single clock cycle.

38. A computer readable medium having stored thereon instructions for causing a computer to implement the following steps:

searching for an item in a stack, the stack including stack data having one or more stack data values, the stack further including a stack pointer list [having a set of references, the set of references including one or more stack pointers, each stack pointer uniquely specifying a stack data value in the stack data] *that includes a set of one or more clocked registers, each clocked register specifying a stack pointer that uniquely references a stack data value in the stack data module*, the one or more stack pointers including [an] *a most recently used* (MRU) slack pointer specifying the most-recently-used stack data value in the stack data and [an] *a least recently used* (LRU) stack pointer specifying the least-recently-used stack data value in the stack data, the stack pointers in the set of references such that stack data values are specified from a most-recently-used data value down to a least-recently-used data value;

if the item is found in the stack data, then promoting the item such that the item is identified as being the most-recently-used, pointer manipulation associated with the promoting of the item occurring during a single clock cycle; and if the item is not found in the stack data, then inserting the item into the stack such that the item is identified as being the most-recently-used.

39. A method for manipulating data in a stack, said stack including stack data having one or more stack data values, said stack further including a stack pointer list [having a set of references, the set of references including one or more stack pointers, each stack pointer uniquely specifying a stack data value in the stack data] *that includes a set of one or more clocked registers, each clocked register specifying a stack pointer that uniquely references a stack data value in the stack data module*, the one or more stack pointers including [an] *a most recently used* (MRU) stack pointer specifying the most-recently-used stack data value in the stack data and [an] *a least recently used* (LRU) stack pointer specifying the least-recently-used stack data value in the stack data, the stack pointers in said set of references being such that stack data values are specified from a most-recently-used data value down to a least-recently-used data value, said method comprising the steps of:

searching for an item in the stack data;

if the item is found in the stack data, then promoting the item such that the item is identified as being the most-recently-used; and if the item is not found in the stack data, then inserting the item into the stack such that the item is identified as being the most-recently-used.

40. A method as defined in claim 39, wherein said step of promoting the item comprises the steps of:

setting the MRU stack pointer to the value of the stack pointer specifying the stack data value matching the item; and shifting down one the values of the stack pointers in the stack pointer list between the MRU stack pointer and stack pointer specifying the stack data value matching the item, noninclusive, wherein said steps of setting the MRU stack pointer and shifting are executed simultaneously.

41. An apparatus for [an] *a most recently used* (MRU) stack, said apparatus comprising:

means for receiving a command;

means for receiving a data value;

a stack data module for storing one or more stack data values, said stack data module being coupled to said data value receiving means for receiving a data value as input;

a stack pointer module for referencing stack data values stored in said stack data module, said stack pointer module being coupled to said stack data module to provide as input a reference to one or more stack data values, said stack pointer module including a stack pointer list [having a set of references, the set of references including one or more stack pointers, each stack pointer uniquely specifying a stack data value in the stack data] *that includes a set of one or more clocked registers, each clocked register specifying a stack pointer that uniquely references a stack data value in the stack data module*, the one or more stack pointers including an MRU stack pointer specifying the most-recently-used stack data value in the stack data and [an] *a least recently used* (LRU) stack pointer specifying the least-recently-used stack data value in the stack data, the stack pointers in said set of references being listed such that stack data values are specified from a most-recently-used data value down to a least-recently-used data value; and a stack control module for the MRU stack, said stack control module being coupled to said command receiving means for receiving a command as input and further being arranged to transmit an output to a stack search requesting unit, said stack control module further being coupled to said stack pointer module to provide operational control of the stack pointer module functions, said stack control module further being coupled to said stack data module to provide control of the accessing of data to and from the stack data module and to receive as input a stack data value, said stack control module further being coupled to said data value receiving means for receiving a data value as input.

[42. An apparatus as defined in claim 41, wherein said stack pointer list includes a set of registers, each register specifying a stack pointer that references a unique stack data value in the stack data module.]

43. An apparatus as defined in claim 41, wherein said stack data module is a memory array having one or more array cells, each cell specifying a stack data value.

*44. A memory apparatus, comprising:*

*a data memory including a plurality of individually addressable cells;*

*a pointer memory including a plurality of clocked registers, each clocked register configured to store a pointer to one of the cells, in one-to-one correspondence with the cells; and*

*a control module, coupled to the pointer memory and the data memory, and configured to change the order in which data values are retrieved from the cells by reordering the pointers in at least some of the clocked registers without shifting the data values in all of the cells, wherein the pointers are reordered in a single clock cycle.*

*45. The apparatus of claim 44, further comprising an address multiplexer with a plurality of inputs and one output, wherein the plurality of address multiplexer inputs are coupled to the outputs of the plurality of clocked registers in*

*one-to-one correspondence with the clocked registers, and wherein the address multiplexer output is coupled to an input of the data memory.*

*46. The apparatus of claim 44, further comprising a plurality of data multiplexers, each data multiplexer having an output coupled to an input of one of the plurality of clocked registers in one-to-one correspondence with the clocked registers.*

*47. The apparatus of claim 46, wherein each data multiplexer has a plurality of inputs coupled to the outputs of the plurality of clocked registers in one-to-one correspondence with the clocked registers.*

*48. The apparatus of claim 44, wherein the control module is further configured to insert a data value into the data memory by storing the data value in one of the cells and by reordering the pointers in at least some of the clocked registers without shifting the data values in all of the cells.*

*49. The apparatus of claim 44, wherein the clocked registers include a most recently used (MRU) clocked register for storing a pointer to a cell storing a most recently used (MRU) data value.*

*50. The apparatus of claim 49, wherein the control module is further configured to insert a data value into the data memory by storing the data value in one of the cells and by updating the pointer in the MRU clocked register to point to the cell in which the data value was stored.*

*51. The apparatus of claim 49, wherein the control module is further configured to promote a data value stored in a current cell in the data memory by storing a pointer to the current cell in the MRU clocked register and by reordering the pointers in at least some of the clocked registers without shifting the data values in all of the cells.*

*52. The apparatus of claim 44, wherein the clocked registers include a least recently used (LRU) clocked register for storing a pointer to a cell storing a least recently used (LRU) data value.*

*53. The apparatus of claim 52, wherein the control module is further configured to insert a data value into the data memory by storing the data value in the cell pointed at by the LRU clocked register and by reordering the pointers in at least some of the clocked registers without shifting the data values in all of the cells.*

*54. The apparatus of claim 44, wherein a $T_n$ clocked register is storing a pointer to a current cell, and wherein a $T_0$ clocked register is storing a pointer to a cell storing a most recently used (MRU) data value, and wherein the control module is further configured to reorder the pointers by shifting the pointers in the $T_0$ clocked register through a $T_{n-1}$ clocked register to a $T_1$ clocked register to the $T_n$ clocked register, respectively.*

*55. The apparatus of claim 54, wherein the control module is further configured to store the pointer to the current cell in the $T_0$ clocked register.*

*56. The apparatus of claim 44, wherein the control module is further configured to change the order in which data values are retrieved from the cells by reordering the pointers in at least three of the clocked registers without shifting the data values in all of the cells, wherein the pointers are reordered in a single clock cycle.*

*57. A method of operating a memory apparatus, the method comprising:*

*storing data in a data memory including a plurality of individually addressable cells;*

*storing pointers in a pointer memory including a plurality of clocked registers, each pointer stored in one of the clocked registers and pointing at one of the cells; and*

*changing an order in which data values are retrieved from the cells by reordering the pointers in at least some of the clocked registers without shifting the data values in all of the cells, wherein the pointers are reordered in a single clock cycle.*

*58. The method of claim 57, further comprising outputting a pointer from one of the clocked registers and inputting the pointer into the data memory.*

*59. The method of claim 57, further comprising outputting a pointer from a data multiplexer and inputting the pointer into one of the clocked registers.*

*60. The method of claim 59, further comprising outputting a pointer from each clocked register and inputting the pointers into the data multiplexer.*

*61. The method of claim 57, further comprising inserting a data value into the data memory by storing the data value in one of the cells and by reordering the pointers in at least some of the clocked registers without shifting the data values in all of the cells.*

*62. The method of claim 57, wherein the clocked registers include a most recently used (MRU) clocked register for storing a pointer to a cell storing a most recently used (MRU) data value.*

*63. The method of claim 62, further comprising inserting a data value into the data memory by storing the data value in one of the cells and by updating the pointer in the MRU clocked register to point to the cell in which the data value was stored.*

*64. The method of claim 62, further comprising promoting a data value stored in a current cell in the data memory by storing a pointer to the current cell in the MRU clocked register and by reordering the pointers in at least some of the clocked registers without shifting the data values in all of the cells.*

*65. The method of claim 57, wherein the clocked registers include a least recently used (LRU) clocked register for storing a pointer to a cell storing a least recently used (LRU) data value.*

*66. The method of claim 65, further comprising inserting a data value into the data memory by storing the data value in the cell pointed at by the LRU clocked register and by reordering the pointers in at least some of the clocked registers without shifting the data values in all of the cells.*

*67. The method of claim 57, wherein a $T_n$ clocked register is storing a pointer to a current cell, and wherein a $T_0$ clocked register is storing a pointer to a cell storing a most recently used (MRU) data value, and further comprising reordering the pointers by shifting the pointers in the $T_0$ clocked register through a $T_{n-1}$ clocked register to a $T_1$ clocked register to the $T_n$ clocked register, respectively.*

*68. The method of claim 67, further comprising storing the pointer to the current cell in the $T_0$ clocked register.*

*69. A memory apparatus, comprising:*

*a data memory including a plurality of individually addressable cells;*

*a pointer memory including a plurality of clocked registers, each clocked register configured to store a pointer to one of the cells, in one-to-one correspondence with the cells; and*

*a control module, coupled to the pointer memory and the data memory, and configured to:*

*change the order in which data values are retrieved from the cells by reordering the pointers in at least some of the clocked registers; and*

*insert a data value into the data memory by storing the data value in one of the cells and by reordering the pointers in at least some of the clocked registers;*

*wherein the pointers are reordered without shifting the data values in all of the cells, and wherein the pointers are reordered in a single clock cycle.*

* * * * *